United States Patent [19]

Klopfenstein et al.

[11] Patent Number: 5,064,665

[45] Date of Patent: * Nov. 12, 1991

[54] METHOD OF MAKING AND USING A RUMINANT FEED

[75] Inventors: Terry J. Klopfenstein; Lowell D. Satterlee; Robert A. Britton, all of Lincoln, Nebr.; Ralph N. Cleale, Levittown, Pa.

[73] Assignee: The Board of Regents of The University of Nebraska, Lincoln, Nebr.

[*] Notice: The portion of the term of this patent subsequent to Sep. 18, 2007 has been disclaimed.

[21] Appl. No.: 471,038

[22] Filed: Jan. 26, 1990

Related U.S. Application Data

[63] Continuation of Ser. No. 28,971, Mar. 23, 1987, abandoned.

[51] Int. Cl.$^5$ .............................................. A23K 1/18
[52] U.S. Cl. ..................................... 426/2; 426/624; 426/630; 426/635; 426/636; 426/207
[58] Field of Search .................. 426/2, 623, 624, 630, 426/635, 636, 807; 514/8, 9

[56] References Cited

U.S. PATENT DOCUMENTS

| | | |
|---|---|---|
| 2,905,558 | 9/1959 | Adams et al. |
| 3,035,920 | 5/1982 | Knodt. |
| 3,202,514 | 8/1965 | Burgess et al. ................ 426/630 X |
| 3,390,909 | 7/1968 | Jantzen. |
| 3,507,662 | 4/1970 | LeRoy et al. |
| 3,875,304 | 4/1975 | Hunt et al. ...................... 426/807 X |
| 4,162,336 | 7/1979 | Brown et al. ................... 426/635 X |
| 4,241,089 | 12/1980 | Regnault et al. .............. 426/635 X |
| 4,542,031 | 9/1985 | Nakajima et al. ............. 426/630 X |

OTHER PUBLICATIONS

Braveman, *Introduction to the Biochemistry of Foods*, 1963, pp. 302-303.

Appendix to Dairy Science Departmental Series, 14(4); Nov. 1970, "Acceptability of Lignin-Sulfonates by Dairy Cows", H. R. Conrad Department of Dairy Science, Ohio Agricultural Research and Development Center, Wooster, Ohio.

Paper NFIA Midyear, Apr. 1979, "Hemicullulose Extract for Ruminants", Department of Animal Science University of Minnesota, St. Paul, Minn., pp. 139-151.

Paper at NFIA Midyear, Apr. 1979, "Heat Treated Protein by the Insta Pro Method".

"The Use of Lignin Sulfonate in Liquid Beef Supplements", pp. 12, 13, 31, Sep. 1974.

"Evaluation of Protective Agents Applied to Soybean Meal and Fed to Cattle", *Journal of Animal Science*, vol. 49, No. 5 (1979).

Ashland Research Progress Report by Larsen, 1976.

Stern, Marshall, "Effect of Lignosulfonate on Rumen Microbial Degradation of Soybean Meal Protein in Continuous Culture"; *Can. J. Anim. Sci.* 64 (Suppl.): 27-28 (Sep. 1984).

Ferguson, K. A., "The Protection of Dietary Proteins and Amino Acids Against Microbial Fermentation in the Rumen", pp. 448-464 from Digestion and Metabolism in the Ruminant, University of New England Press, Armidate, Australia, edited by McDonald et al.

"Rumen By-Pass and Protection of Proteins and Amino Acids", 1198-1218, Symposium: Protein and Amino Acid Nutrition, *Journal of Dairy Science*, vol. 58, No. 8.

"The Effect of a Modified Sulfite Waste Liquor and of Calcium Gluconate on Milk Production"R. S. Emery et al., presented at ADSA Meeting, Logan, Utah, Jun. 1960.

(List continued on next page.)

*Primary Examiner*—Arthur L. Corbin
*Attorney, Agent, or Firm*—Vincent L. Carney

[57] ABSTRACT

To increase the efficiency of utilizing protein in feed by ruminants, feed containing a protein and a reducing sugar are mixed in quantities suitable for the Maillard reaction. The mixture is heated at a temperature, pH and time sufficient to cause early Maillard reactions but not advanced Maillard reactions.

14 Claims, 5 Drawing Sheets

OTHER PUBLICATIONS

Van Soest, "Nutritional Ecology of the Ruminant", O and B Books, Inc., 1315 NW Kline Place, Covallis, Oreg. (1982), pp. 114–119 and 178–249.

Morrison, Frank B., "Feeds and Feeding", pp. 308, 308; The Morrison Publishing Company (1951).

deMan, John M., "Principles of Food Chemistry", The Avi Publishing Company, Inc., (1980), pp. 98 and 99.

McCullough, M. D. et al., "Silage Management", Silage Technology Division, National Feed Ingredients Association, One Corporation Place—Suite 375, West Des Moines, Iowa 50265 (1984), pp. 117–119.

Chalupa and Montgomery, "Fermentability of Masonex and Cane Molasses", *Journal of Animal Science*, vol. 48, No. 2 (1979), pp. 393–400.

Snyder, Harry E. et al., "Soybean Utilization", An Avi Book, published by Van Nostrand Reinhold Company, New York, N.Y.

AMMONIA PRODUCTION BY RUMINAL MICROBES IN BATCH CULTURE

PROTECTION WITH SSL

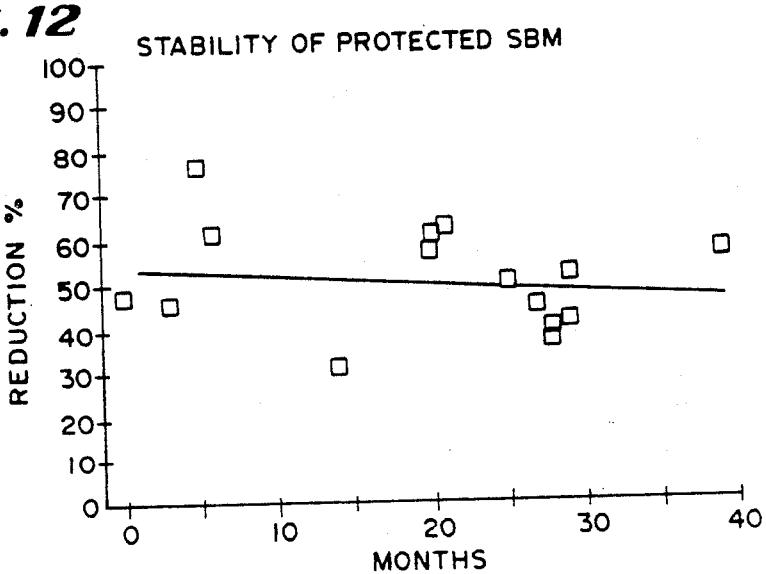
FIG. 12 STABILITY OF PROTECTED SBM
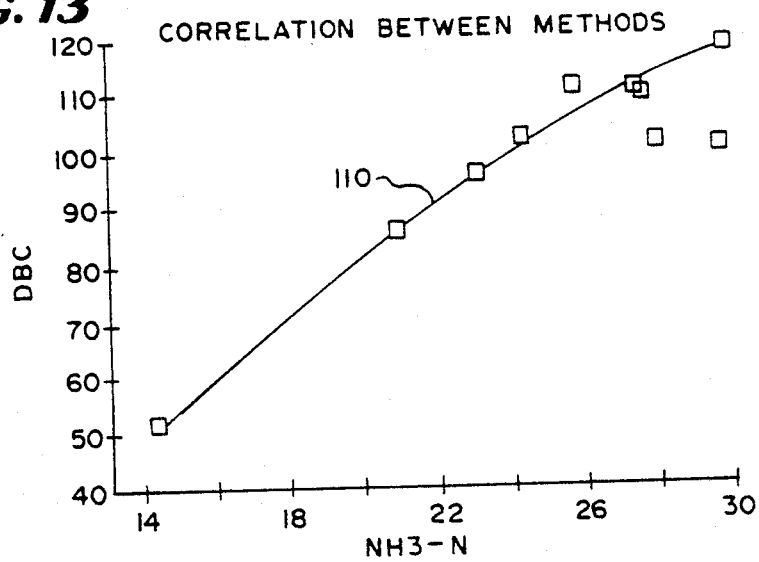
FIG. 13 CORRELATION BETWEEN METHODS
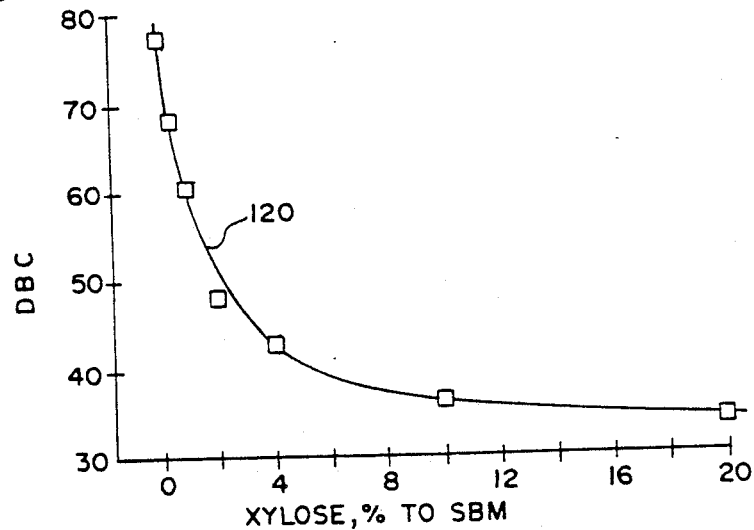
FIG. 14

METHOD OF MAKING AND USING A RUMINANT FEED

This application is a continuation of application Ser. No. 07/028,971 filed Mar. 23, 1987, now abandoned.

BACKGROUND OF THE INVENTION

This invention relates to a livestock feed, the preparation of livestock feed, and the feeding of livestock to increase utilization of protein by ruminants.

It is known to treat feed for ruminants to reduce the premature degrading of the protein in the rumen. For example, protein in diets fed to cattle has been treated to decrease microbial degradation of the protein in the rumen. One specific method of treatment is described in Stern, Marshal D., September 1984, "Effect of Lignosulfonate on Rumen Microbial Degradation of Soybean Meal Protein in Continuous Culture", *Can. J. Anim. Sci.*, 64 (Suppl.):27–28.

This publication describes the pelleting of soybean meal with lignosulfonate and its effect when incorporated in the feed of cattle. Moreover, in United States Pat. No. 4,377,576 issued to Howard J. Larsen, on Mar. 22, 1983, a method of feeding dairy cows with sulfite liquor is described.

Other prior art methods of treating proteins to reduce the premature microbial degradation of proteins have included treatment with formaldehyde or treatment by increasing the temperature to cause browning or crosslinking of the protein. It is also known to supplement high protein feeds with carbohydrates including sugars.

The prior art methods of altering the protein in feeds may be economical under some circumstances but it is important to achieve the maximum cost saving and the best utilization of protein such as by increasing the efficiency with which protein is used by the animal. The prior art feeds and methods fall short of these goals by, in some cases, providing protein which has reduced nutritional value in an effort to increase the amount of protein actually transferred from the rumen to the small intestine of ruminants or have other disadvantages.

For example, in the prior art use of lignosulfonate with feed, the reactions described would not cause a person reading then to prepare an effective feed because they do not provide information from which one would understand or know (1) the process requires reducing sugars; (2) the reaction must not continue to a stage where the resulting product is not utilized effectively in the small intestine of a ruminant; and/or (3) the reaction conditions such as pH, temperature and time necessary to form an effective feed.

SUMMARY OF THE INVENTION

Accordingly, it is an object of the invention to provide a novel feed which increases the utilization of protein by animals.

It is a further object of the invention to provide a novel method for feeding livestock.

It is a still further object of the invention to provide a novel method for preparing feed which reduces the premature microbial degradation of protein in a superior manner.

It is a still further object of the invention to provide a novel technique for utilizing reducing carbohydrates to improve the utilization of protein by animals.

It is a still further object of the invention to provide a novel process for using sulfite liquor to improve feed quality.

It is a still further object of the invention to provide a novel feed with reduced susceptibility to degradation of its protein in the rumen and which is modified by the acidity of the abomasum to improve utilization in the lower digestive tract.

It is a still further object of the invention to provide a novel process which reduces free amino group availability of protein in feed protease but is reversible in the abomasum.

It is a still further object of the invention to improve the utilization of sulfite liquor in animal feeds.

It is a still further object of the invention to provide a novel feed composition giving reduced degradation of feed protein by rumen micro-organisms and increasing the amount of protein digested and absorbed in the post rumen gastro-intestinal tract.

It is a still further object of the invention to increase the net protein available from feed for milk production in cows whose genetic capability is limited by nutrient uptake during peak lactation.

It is a still further object of the invention to provide a novel method of reducing degrading of protein in feed without using potentially harmful substances.

It is a still further object of the invention to provide degrading of protein in feed while using by-products of other industries.

In accordance with the above and further objects of the invention, reducing carbohydrates are reacted with functional groups of proteins in animal feeds. Parameters such as the ratio of sugar to protein, temperature, time and pH are selected to achieve a reduction in free amine groups while maintaining reversibility in the acidic environment of the abomasum of the animal. This is done using parameters that minimize the cost while maximizing the efficiency by which the protein is recovered by an animal from the rumen. Generally, the more reactive the reducing carbohydrate is, the smaller the ratio of reducing carbohydrate to protein for optimum temperature and pH.

The reducing carbohydrates should react with at least a substantial portion of the free alpha and epsilon amino groups present in the protein. The reaction should be reversible at acidic pHs lower than 4.0.

The animal feed made in accordance with the invention includes a substantial amount of condensation products of the proteins and reducing carbohydrates. Because the more reactive the carbohydrate is, the more economical it is to form such condensation products, the reducing carbohydrate sources are selected from the sugars xylose, glocose, fructose, lactose, mannose, ribose, hemicelluloses extracts and their hydrolysates, sugars contained in spent sulfite liquor, molasses and its hydrolysates, corn products and their hydrolysates, and mixtures thereof. Generally, the proteins are those found in high quality protein feed such as soybean meal, other bean meal, cottonseed meal, feather meal, blood meal, silages, meat and bone meal, sunflower seed meal, canola meal, peanut meal, safflower meal, linseed meal, sesame meal, early bloom legumes, fish products, milk products, poultry products, hays, corn, wheat, alfalfa, barley, milo, sorghum and the like, and mixtures thereof.

The feed comprises a mixture of organic materials including at least one reaction product of a feed protein and a reducing carbohydrate wherein the percentage of reducing carbohydrate on feed protein is about 0.5 percent to about 40 percent by weight such that degradability of the feed protein by rumen microorganisms is reduced and there is no significant reduction of protein digestibility in the post rumen tract. The reaction product is a condensation product of the carbohydrate and protein.

The ratio of weight of said condensation product of a protein and a sugar to the weight of proteins having free alpha and epsilon amino groups in the feed is believed to be at least 1.5 to 1.0 but it may be processed until there is substantially no protein with free amine groups.

To prepare the feed, a reducing carbohydrate is mixed with a livestock feed material, with the reducing carbohydrate being sufficient to significantly reduce the degradation of proteins to amino acids by microbial protease. An optimum ratio of reducing sugar is 1 mole of sugar for each mole of free amino group or at least sugar equalling 0.5 percent of the protein by weight but preferably 6 percent.

More specifically, the percentage of reducing carbohydrate on feed protein is about 0.5 percent to about 40 percent by weight. The mixture is heated at a temperature, pH and percent moisture for a time sufficient to reduce the degradability of the feed protein by rumen microorganisms and provide no significant reduction in protein digestibility in the post rumen tract. This method utilizes a pH of about 4.0 to about 10.5, prefereably about 6 0 to about 8.5, a percent moisture from about 6 percent to about 40 percent, prefereably about 15 percent to about 25 percent, a temperature from about 20 degrees centigrade to about 150 degrees centigrade, preferably about 80 degrees centigrade to about 110 degrees centigrade and a time from about 20 minutes to about 72 hours, prefereably about 1 hour to about 4 hours.

The sugar and product containing protein are mixed in quantities sufficient to cause a substantial proportion of the alpha and epsilon amino groups in the protein to react with the carbonyl groups in the sugar to form a condensation product and the mixture is heated at a temperature, time and pH sufficient to cause condensation but insufficient to cause intermediate and final Maillard reactions and irreversible rearrangements. In the case where glucose is the reducing sugar, for example, the desired reaction corresponds to the transition of an aldose sugar to a ketose sugar derivative but does not proceed to the conversion of glycosylamine to a 1-amino-1-deoxy-2-ketose. If the sugar is ketose, on the other hand, the temperature and time are higher than that required for the formation of 2-amino-2-deoxyaldose from a ketosylamine.

This process may be described as Maillard reactions in that the materials are mixed in quantities such as are suitable for the Maillard reaction and the mixture heated at a temperature, pH and time sufficient to cause early Maillard reactions but not advanced Maillard reactions. The pH is maintained above a pH of 4 and preferably at 8.5.

To economically supply the sugar, benign by-products are desirable as a source of reducing carbohydrates. Benign by-products in this application mean a substance which is a by-product of another industrial product but not toxic to ruminants. Toxicity means it can be at least 3 percent of a ruminant's total diet without deletaneous results and can meet the licensing requirements set by government bodies for feeds.

In one embodiment of this invention, a well-known benign product is used. In this embodiment, sulfite liquor containing xylose and possibly another reducing sugar are added to feed to form an effective amount of reducing sugar and protein to enable the efficient use of the protein by ruminants.

To feed livestock a high protein feed suitable for a ruminant, a reaction product of the feed protein and a reducing carbohydrate is obtained wherein the percentage of reducing carbohydrate on feed protein is about 0.5 percent to about 40 percent by weight such that the degradability of the feed protein by rumen microorganisms is reduced and there is no significant reduction of protein digestibility in the post rumen tract. The mixture of protein feed and reducing carbohydrate is heated at a temperature, pH and percent moisture for a time sufficient to cause reaction but insufficient to significantly reduce the protein digestibility in the post rumen tract.

This improved protein feed may be substituted for a part or all of the usual protein feed being supplied to the animal, resulting in improved efficiency of milk, meat and/or wool production. Specifically, increased production yields may be obtained with same feed protein levels, or same production yields may be obtained at reduced feed protein levels.

More specifically, a condensation product of protein from a protein containing feed and a reducing sugar is obtained, with the ratio of the condensation product to protein having free alpha and epsilon amino groups being at least 1.5 to 1.0. This feed is used in amounts reduced by at least 20 percent for the corresponding protein-containing feed for each pound of the feed containing the condensation product substituted for the feed base.

As can be understood from the above description, the novel feed, method of making the feed and method of feeding animals has the advantage of providing a superior economical feed and method of feeding animals.

SUMMARY OF THE DRAWINGS

The above noted and other features of the invention will be better understood from the following detailed description when considered with reference to the accompanying drawings in which:

FIG. 12 is a graph illustrating the stability of feed made in accordance with the invention;

FIG. 13 is a graph illustrating one aspect of the useful range of a reducing sugar in accordance with the invention; and FIG. 14 is another graph illustrating another aspect of the useful range of a reducing sugar in accordance with the invention.

DETAILED DESCRIPTION

Figure 1:
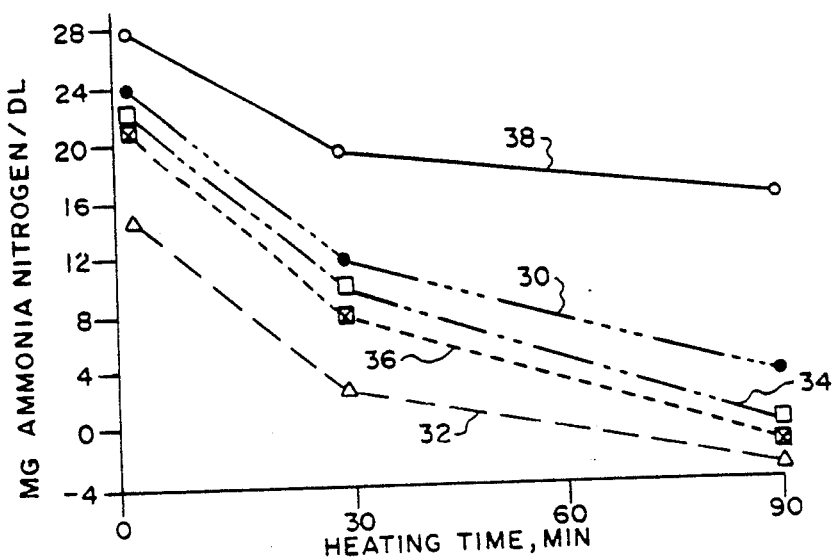
FIG. 1 is a graph illustrating the results of in vitro tests indicating the reduction in microbial degradation of protein in accordance with an aspect of the invention.

Broadly, the animal feed includes a substantial amount of reaction products of proteins and reducing carbohydrates. Because the more reactive the reducing carbohydrate is, the easier it is to form such reaction products, sugar sources are selected from the reducing sugars xylose, glucose, fructose, mannose, lactose, ribose, hemicellulose extracts and their hydrolysates, sugars contained in spent sulfite liquor, molasses and its hydrolysate, corn products and their hydrolysates, and mixtures thereof.

Generally, the proteins used are those found in high quality protein feed such as soybean meal, other bean meal, cottonseed meal, meat and bone meal, sunflower seed meal, canola seed meal, peanut meal, safflower meal, linseed meal, sesame meal, early bloom legumes, fish products, milk products, poultry products, hays, corn, wheat, alfalfa, barley, milo, sorghum and the like and mixtures thereof. Preferably, the reducing sugars used are those from economical sugar sources such as spent sulfite liquor or dried spent sulfite liquor which is a by-product of some wood industries and a source of xylose. However, mixtures of sugars are sometimes used.

In this specification, the term "orthodox feed" means the feeds normally fed to ruminants. Such feeds are well-known in the art and include the high quality protein feeds described above and other feeds, which because they are not considered a high quality protein feed, are less likely to be used in the treatment. Such feeds include among others, soybean meal, other bean meal, cottonseed meal, feather meal, blood meal, silages, meat and bone meal, sunflower seed meal, canola meal, peanut meal, saflower meal, linseed meal, sesame meal, early bloom legumes, fish products, by-product protein feedstuffs like distillers and brewers grains, milk products, poultry products, hays, corn, wheat, alfalfa, barley, milo, sorghum and the like and mixtures thereof.

The particular feed may be selected for economic reasons or reasons of supply but, since the methods described herein are applicable to protein in general regardless of the feed, the steps in performing the method are the same although the actual reaction products may differ.

For reasons of economy, this process is intended principally for protein supplements. In this specification protein supplements are feedstuffs containing a minimum of 20 percent protein with at least 25 percent of the protein being microbially degradable protein. Microbially degradable protein in this specification is protein which is cleaved by microbial protease.

Some orthodox feeds suitable as protein supplements are soybean meal, sunflower meal, cottonseed meal, canola seed meal, safflower meal, linseed meal, peanut meal, sesame meal, early bloom legumes such as alfalfa and by-product protein feedstuffs like distillers and brewers grains, fish by-products, poultry by-products and meat and bone meal.

Similarly, by the term "reaction product of a sugar and a protein" when used in this specification, means a condensation product obtained by reacting: (1) any protein useful in feeding livestocks and commonly found in orthodox livestock feeds; and (2) a reducing carbohydrate selected for its efficiency in reduction reaction with proteins. Generally, it is believed that the reactions are reactions with free amine groups redundant in the proteins and the carbonyl groups of the reducing sugars. These reactions are well-known in the art. In this specification, free amine group means groups which are susceptible to cleavage by microbial protease and able to react with the reducing sugar. This excludes hidden lysine amino groups and groups which are protected when another group reacts with the reducing sugar.

Similarly, suitable reducing carbohydrates are well-known and, generally, to shorten the time and reduce the temperature, the most reactive reducing carbohydrates are selected as described in this specification but under certain circumstances, other reducing carbohydrates may be selected.

This improved feed may be prepared in several different ways utilizing different ones of the suitable feeds and different ones of the reducing carbohydrates as raw materials. In each case, a reaction takes place between the sugar and proteins in the feed used as a raw material which reduces the degradation of the protein in the rumen of an animal by microbes and thus increases the protein available for digestion in the small intestine of the animal.

With this product, there is less degradation of the protein and less conversion to other nitrogen compounds, such as ammonia, by ruminal microbes. Most suitably, the feed material is mixed with a reducing sugar to maximize the reaction. The pH is selected along with temperature, percent moisture and time of treatment to maximize the production of compounds which resist degradation by ruminal microbes but nonetheless permit digestibility and use of the protein in the post rumen tract.

It is believed that the reaction forming this feed corresponds to what has been described in the literature as the early Maillard reactions and comprises a condensation reaction between the carbonyl group of a reducing sugar and amino groups of the protein. The early Maillard reactions are well-known and from the detailed specification herein, the pH, temperature, moisture and time required to carry the reaction to the optimum extent can be determined with little experimentation.

It is believed that the reaction is generally a 1 mole to 1 mole reaction between free amine groups and the reducing carbohydrate and with some consideration being given to other reactions in the feed, the quantities of sugars which are most economically utilized with the feed can be determined even though some suitable feed materials are not specifically described herein. The pHs should be about 4 to about 10.5 and preferably about 6 to about 8.5. The time, temperature and moisture offer more leeway since a lower temperature for a longer time may be used in some circumstances or a higher temperature for a shorter time where economy dictates.

In general the temperature of the reaction ranges from about 20 degrees centigrade to about 150 degrees centigrade with 80 degrees centigrade to 110 degrees centigrade being preferred, and the time of the reaction ranges from about 20 minutes to about 72 hours with 1 hour to 4 hours preferred. The amount of water affects the reaction, and the percent moisture ranges from about 6 percent to about 40 percent with 15 percent to 25 percent preferred.

Without wishing to be bound by any particular theory, it is believed the following description illustrates the reaction mechanisms involved between the proteins and reducing carbohydrates which result in the feed of the present invention.

More specifically, it is believed a reducing sugar and a livestock feed containing protein are mixed in quantities sufficient to cause enough of the alpha and epsilon amino groups in the protein to react with the carbonyl groups in the sugar to form a reaction product when the mixture is heated at a temperature, time, moisture and pH to cause reactions corresponding to those in the chemical equation labeled formula 1, where R is a protein having the alpha amino group or epsilon amino shown, R1 is the remaining portion of the carbohydrate shown in Formula 1 and R2 is a portion of R1 resulting from the reaction as shown.

FORMULA 1

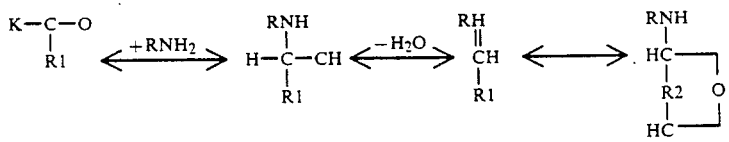

FORMULA 2

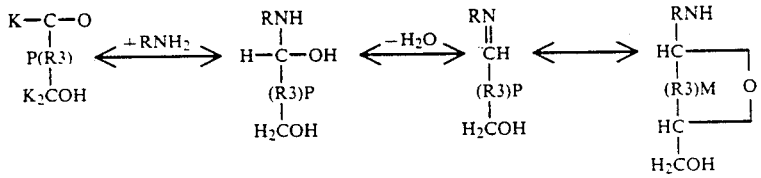

If a simple reducing sugar is the reducing carbohydrate, it is believed that the reaction is shown in the chemical equation labeled formula 2 where R is the remaining portion of the reducing sugar, R3 is a methyl hydroxy unit which together with aldehyde and keto groups are typical of a sugar. P is a number of the indicated functional groups and M is a number one group less than P. If the reducing sugar is glucose, it is believed that the reaction is shown in the chemical equation labeled formula 3 in which the glucose reacts with an addition compound to result in a Schiff base which immediately proceeds to glucosylamine.

The browning of the glucosylamine by advanced and final Maillard reactions is shown in formula 4. The reaction is strong enough, for example, to cause transition of an aldose sugar to a ketose sugar derivative.

FORMULA 3

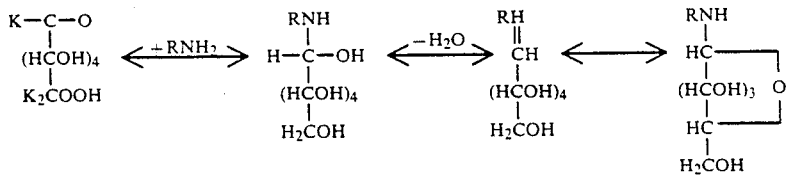

FORMULA 4

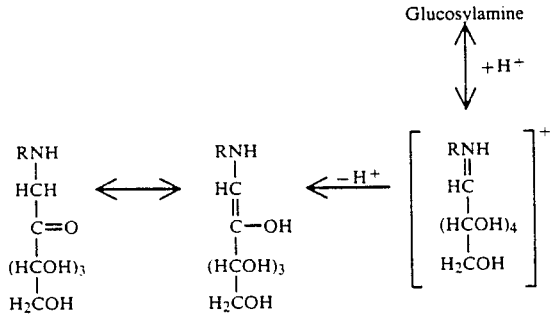

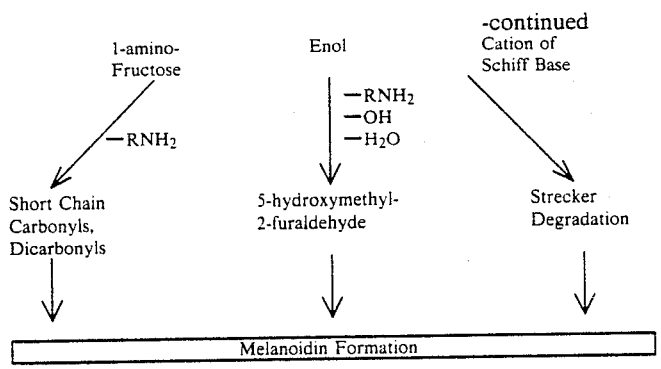

The mixing of the reducing carbohydrate and feed is in proportions such as are suitable for the Maillard reaction and the mixture is heated at a temperature, pH, moisture level and time sufficient to cause early Maillard reactions but not advanced Maillard reactions. Thus, the time and temperature are selected to be sufficient to form glycosylamine but insufficient to form 1-amino-1-deoxy-2-ketose.

Some epsilon amino groups are not available for microbial action because of inhibiting effects of other groups. These inhibiting effects may be due to the conformal structure of the protein or groups chemically bound in the vicinity. It is believed that the temperature at which the early Maillard reactions occur may affect such inhibiting by changing the conformal structure to increase or decrease hidden amino groups. The groups not available for reaction with microbial protease are under some circumstances not available for reaction with the reducing sugar and may reduce the amount of sugar needed for some reactions. For example, the use of high temperatures for a short time may decrease the amount of sugar needed for the same final result in the effectiveness of the feed.

Generally, the feed is prepared by mixing a reducing sugar with a suitable protein containing feed at a desired percent moisture in a controlled ratio and applying temperature at a pH and for a time suitable to cause early Maillard reactions but not so long as to cause advanced or final Maillard reactions. Thus, condensation products are formed between the reducing carbohydrate and the protein for a substantial amount of the protein between the carbonyl group of the reducing carbohydrate and a free amine group of an amino acid or protein in a 1 to 1 ratio. The condensation product loses a molecule of water and is converted to a Schiff's base which, in turn, undergoes cyclization to the corresponding substituted sugar amine.

For example, when glucose is the sugar, the amino group is converted to a N-substituted glycosylamine. The reaction is terminated before there is a transition of the aldose sugar to a ketose sugar derivative by way of the Amadori rearrangement. In the case of glucose, this is a conversion of glycosylamine to a 1-amino-1-deoxy-2-ketose. As a further example, in the case of ketose sugars, the reaction is terminated before a rearrangement corresponding to the Heyns rearrangement to form a 2-amino-2-deoxyaldose from the ketosylamine.

The source of the protein is not significant as long as it is a protein suitable for livestock and such proteins are well-known. Similarly, any reducing carbohydrate may be used but some are more efficient than others. The most suitable reducing carbohydrates are those that are most reactive and include xylose, fructose, glucose and lactose with xylose being the most reactive. Generally, the pH is controlled to be above 4 and below 10.5 and preferably at 6 to 8.5. The pH is controlled by any suitable method including the addition of sodium hydroxide.

In feeding livestock, at least 50 percent and under some circumstances a 100 percent increase in the protein use efficiency may be taken into account and used either to increase the weight gain from protein limited diets or to reduce the cost of the feed. The treated feed material is intended primarily for ruminants and can be used accordingly as a substitute for untreated high-protein feed. In some cases, the corresponding untreated protein supplement that would otherwise be fed can be reduced and the amount of treated protein feed supplement is less than the untreated protein supplement because of the increased protein use efficiency of the treated protein supplement.

While many of the variables can be selected by the users of this invention, the following nonlimititive examples illustrate the invention.

EXAMPLES

1. Materials and Methods

Sodium hydroxide was added to soybean meal to adjust pH in amounts determined as follows. Ten grams of soybean meal dry matter were weighed in triplicate and hydrated with 100 ml (milliliters) distilled deionized water. Hydrated samples were homogenized for 2 minutes at moderate speed with a blender and allowed to equilibrate for 2 hours at 21 degrees Celsius. Homogenates were titrated with standardized NaOH and pH changes monitored with a saturated calomel electrode. During titration, agitation of homogenates was maintained with a magnetic stir bar. Quantities of NaOH required to adjust pH to 8.5 or 10.0 were calculated as equivalents/g soybean meal dry matter.

2. In Vitro General Conditions

Microbial degradation of treated soybean meal samples was the response variable in all trials and was measured by the in vitro ammonia release procedure described by Britton, R.A. and T.J. Klopfenstein. 1986. "Zinc treated soybean meal: A method to increase by-pass". Nebraska Beef Cattle Report, MP 50. University of Nebraska, Lincoln. pp. 45-57.

Equal volumes of ruminal fluid were collected from steers fed maintenance diets of either ground =alfalfa hay or ground corn cobs containing 11 percent molasses and 17 percent soybean meal (dry matter basis). Following fermentation for 24 hours, ammoniacal nitrogen was determined by an automated adaptation of the indophenol method of McCullough, J. 1967. "The determination of ammonia in whole blood by a direct colorimetric method". Clin Chim. Acta. 17:297.

3. In Vitro Examples

EXAMPLE 1

An evaluation was made of the main effects on protein of reducing sugars, time of heating and proportions of reducing sugar and protein. In these tests: (1) reducing sugar sources were xylose fructose, glucose and lactose; (2) reducing sugar levels were at 1, 3 and 5 mol/mol lysine; and (3) heating times at were 0, 30 and 90 minutes at 150 degrees Celsius. The interactions between main effects were also evaluated. Soybean meal samples were heated with pH and moisture altered, but without reducing sugar, to estimate the effect of sugar additions.

In these tests, the protein fraction of soybean meal was assumed to contain 6.3 percent lysine in accordance with "Nutrient Requirements of Domestic Animals", 1979, No. 2, "Nutrient Requirements of Swine". *National Research Council.* Washington, D.C. The soybean meal source was dehulled, solvent extracted soybean meal which had not passed through a desolventizer-toaster and was thus untoasted during processing and it contained 53.0 percent crude protein on a dry matter basis.

Prior to heating, appropriate quantities of the reducing sugars were added to untoasted soybean meal which had previously been treated with NaOH to achieve pH 8.5. Distilled water was added so that each sample contained 83 percent dry matter. Heated samples were obtained by placing 126 g (grams) samples in 9 cm (centimeters) ×12 cm ×5 cm aluminum pans and heating to 150 degrees Celsius in a forced air oven. Following heating, samples were cooled to 23 degrees Celsius, air dried for 72 hours and ground to pass through a 2 mm (millimeter) screen. This procedure for sample preparation after heating was followed in all subsequent experiments.

Prior to ammonia release analysis, sugar content, expressed as a percent of sample dry matter, was made equal in all samples to eliminate confounding of ammonia release by reducing sugar concentration. Previous results with commercial soybean meal as the protein source indicated ammonia release following a 24-hour fermentation was unaffected by source of reducing sugar when sugars were added on the same weight to weight ratio with soybean meal. Samples were analyzed in duplicate for ammonia release. Contrast coefficients for the main effect of heating time were calculated. The results are shown in FIGS. 1, 2 and 3 respectively.

In FIG. 1, there is shown a graph of ammonia nitrogen release against heating time for reducing sugars in which curve 30 represents the interaction of fructose with time of heating, curve 32 represents the interaction of xylose with time of heating, and curve 34 represents the interaction of lactose with time of heating. Curve 38 indicates ammonia nitrogen released in the absence of reducing sugar for comparison.

Figure 2:
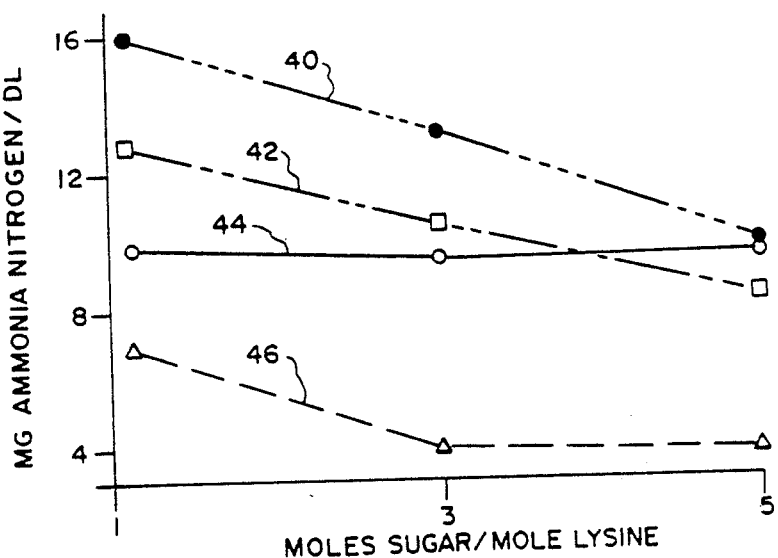
FIG. 2 is a graph illustrating the results of in vitro tests indicating the reduction in microbial degradation by treatment with reducing sugars related to ratio of reducing sugar to protein in accordance with an aspect of the invention.

In FIG. 2, there is shown a graph of ammonia nitrogen released against the number of moles of reducing sugar for each mole of lysine, with the curve 40 being for fructose, the curve 42 being for glucose, the curve 44 being for lactose, and the curve 46 being for xylose.

Figure 3:
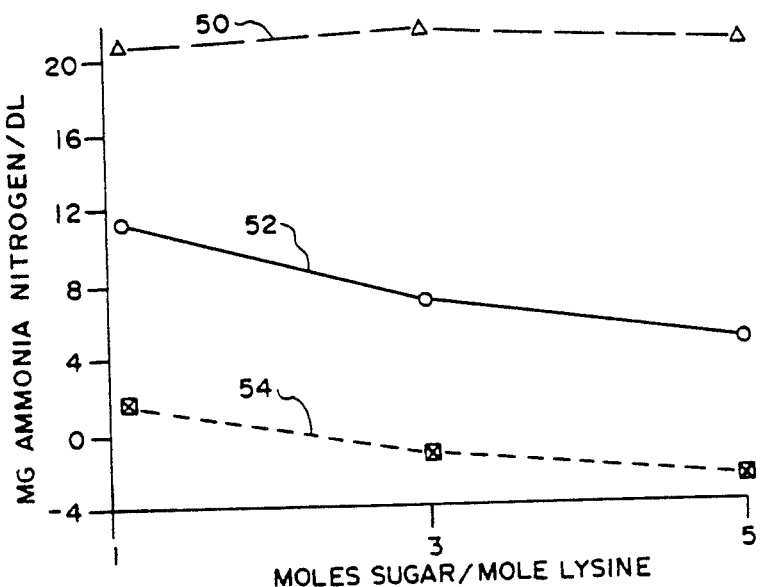
FIG. 3 is a graph illustrating the results of in vitro tests indicating the effect of heating time of feed during preparation with ratios of reducing sugar to protein on microbial degradation.

In FIG. 3, there is shown a graph of ammonia nitrogen released against the ratio of moles of sugar for each mole of lysine for different heating times. In this graph, curve 50 is a control without heating, curve 52 is the amount of ammonia released for a preparation with 30 minutes heating, and curve 54 is the amount of ammonia released for a preparation with 90 minutes of heating.

EXAMPLE 2

Effects on ammonia release of commercial soybean meal containing no sugar or reducing sugars (xylose, glucose, fructose or lactose), and unheated (23 degrees Celsius) or heated for 30 or 60 minutes at 150 degrees Celsius were studied. On a dry matter basis, soybean meal without sugar contained 46.5 percent crude protein. Sugars were added to soybean meal without sugar at 3 mol/mol lysine, pH was adjusted to 8.5 and all samples contained 80 percent dry matter.

Pans containing samples for heating were prepared as described for example 1 except they were sealed with aluminum foil during heating. Following heating, sugar content was equalized in all samples prior to ammonia release analysis as described for example 1.

Figure 4:
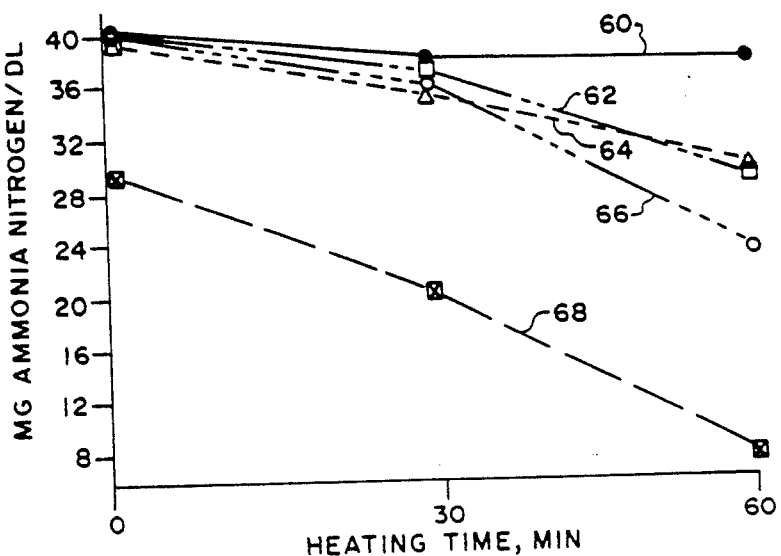
FIG. 4 is a graph illustrating the results of in vitro tests indicating the effect of heating time on the preparation of feeds using several reducing sugars.

Samples were prepared in duplicate and each analyzed for ammonia release in duplicate in two ammonia release runs. Data were analyzed as a randomized complete block design with a 5×3 factorial arrangement of treatments, and run was the blocking criterion. When no block * sugar source * heating time interaction was observed, this term was removed from the statistical model and data were analyzed for main effects and sugar source, by heating time interactions. The results are shown in FIG. 4, which is a graph illustrating the effect of heating time in preparation of the feed on microbial degradation, with curves 60, 62, 64, 66 and 68 illustrating tests respectively on: (1) a control feed without a reducing sugar; (2) a feed prepared with lactose; (3) a feed prepared with fructose; (4) a feed prepared with glucose; and (5) a feed prepared with xylose.

EXAMPLE 3

Susceptibilities of commercial soybean meal or untoasted soybean meal to nonenzymatic browning as measured by in vitro ammonia release were studied. Each soybean meal was treated with NaOH to adjust pH to 8.5, xylose at 3 mol/mol lysine and distilled water to attain 80 percent dry matter in each sample. Samples were unheated so as to be 23 degrees Celsius or were heated at 150 degrees Celsius for 30 or 60 minutes in a forced air oven as described for example 2.

Figure 5:
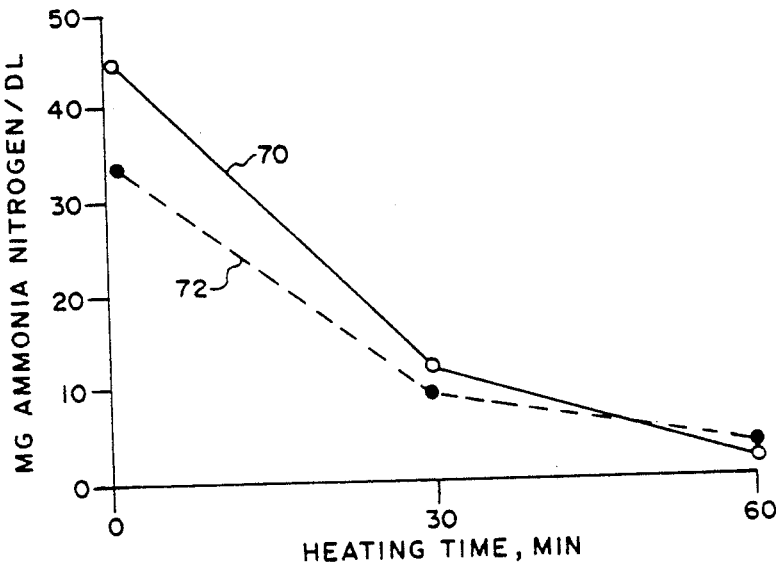
FIG. 5 is a graph illustrating the effect of preparation in accordance with the invention on commercial and untoasted soybean meal.

Samples were prepared in duplicate and each analyzed for ammonia release in duplicate in two ammonia release runs. Data were analyzed as a randomized complete block design with a 2×3 factorial arrangement of treatments with run as the blocking criterion. When no block by soybean meal source by heating time interaction was observed, this term was removed from the statistical model and data were analyzed for main effects and soybean meal source by heating time interactions. The results are shown in FIG. 5, in which curve 70 is for untoasted soybean meal and curve 72 is for commercial soybean meal.

EXAMPLE 4

Effects of pH at each of natural pH, 8.5 pH and 10.0 pH were measured when xylose was added commercial soybean meal at a rate of 3 mol/mol lysine and were unheated or heated for 20, 40 or 60 minutes at 150 degrees Celsius. The natural pH of commercial soybean meal homogenates prior to NaOH addition was 6.5.

Samples contained 80 percent dry matter. Heating procedures were the same as described for example 2.

Figure 6:
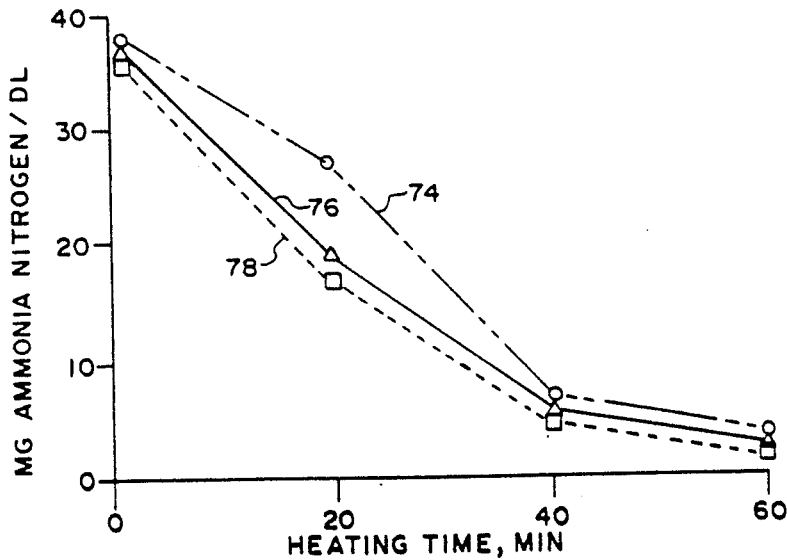
FIG. 6 is a graph illustrating the effect of pH on preparation of feeds in accordance with the invention.

Samples were prepared in duplicate and each analyzed for ammonia release in duplicate in two ammonia release runs. The data were analyzed as a randomized complete block design with a 3×3 factorial arrangement of treatments and run was the blocking criterion. The data were analysed for main effects and pH by heating time interaction. The results are shown in FIG. 6, in which curves 74, 76 and 78 represent preparation at natural pH, ph 8.5 and pH 10.0, respectively.

EXAMPLE 5

Effects on ammonia release of percent dry matter (at 65, 70, 75, 80, 85 and 90 percent) of commercial soybean meal containing xylose in the quantity of 3 moles of xylose for each mole of lysine was measured for samples heated at 150 degrees Celsius for 30 minutes. The pH of samples was 8.5. Additionally, the effect of retaining moisture in the pans was evaluated by sealing half the pans with aluminum foil.

Figure 7:
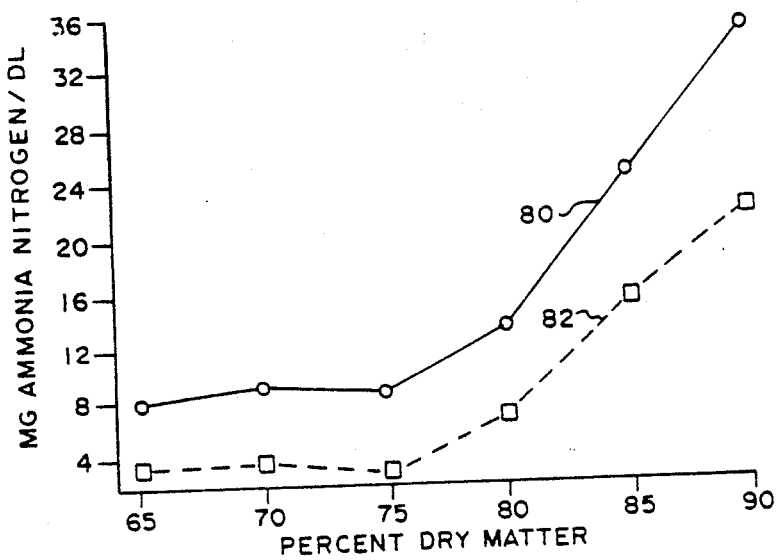
FIG. 7 is a graph illustrating the effect of dry matter on the preparation of a feed in accordance with the invention.

Samples were prepared in duplicate and each analyzed for ammonia release in duplicate in two ammonia release runs. Data were analyzed as a randomized complete block design with a 6×2 factorial arrangement of treatments with run as the blocking criterion. The data were analyzed for main effects and dry matter level by covering interactions. The results are shown in FIG. 7, in which curves 80 and 82 illustrate the effect on dry matter when prepared in uncovered and covered pans, respectively.

4. In Vitro Results

As shown in FIG. 1, interactions fructose, lactose and glucose for the linear effect of heating are not significant. However, an interaction was noted when fructose, lactose and glucose were compared to xylose for the linear effect of heating time.

Without heating, addition of xylose suppressed ammonia release more than fructose, lactose and glucose indicating that xylose reacted faster with untoasted soybean meal at room temperature, under the existing conditions of pH and moisture, than the other sugars. These data further suggest that, given sufficient heating time (90 minutes), lactose and glucose can cause ammonia release suppression equal to xylose.

When heated for 30 minutes, ammonia release from samples treated with xylose was only 20 percent of that from untoasted soybean meal heated without sugar as shown in FIG. 1. These data suggest sugar addition augments the effect of pH, moisture level and heating on nonenzymatic browning as measured by ammonia release.

As shown in FIG. 2, interactions were found between reducing sugar sources and levels when pooled across heating times. Linear and quadratic contrasts of reducing sugar levels revealed no interactions between xylose, fructose and glucose. Increasing levels of xylose, fructose and glucose from 1 to 5 mol/mol lysine resulted in similar rates of ammonia release suppression. However, lactose did not act similarly and ammonia release at all levels of lactose was the same.

A possible explanation for lack of response to increasing levels of lactose may be due to steric hindrance caused by the molecular size of this disaccharide. Lactose may readily react with exposed lysyl residues at low concentrations but, because of its size, be unable to penetrate the tertiary structure of soybean meal protein and interact with lysyl residues on the interior of the molecule.

As shown in FIG. 3, interactions between samples heated 30 or 90 minutes with different levels of reducing sugar were not significant. An interaction did exist however, when samples heated 30 or 90 minutes were compared to unheated samples for the linear effect of sugar levels. Since temperature and duration of heating are considered the primary factors influencing rate of nonenzymatic browning, an interaction between level of reducing sugar and heating time might be expected.

Since browning reactions will occur at ambient temperatures on the primary reaction between casein and glucose, an interaction between level of reducing sugar and heating time might be expected. Browning reactions will occur at temperatures slightly above 0 degrees Celsius, but may require weeks to progress to a measurable extent. In the studies, samples were heated within 24 hours from the time sugar, pH and moisture adjustments were made, and were stored at 4 degrees Celsius in the interim. When heat was applied, however, there was a linear decrease in ammonia release as sugar concentration increased from 1 to 5 mol/mol lysine.

As shown in FIG. 4, an interaction was noted when commerical soybean meal treated with xylose, fructose, glucose or lactose by the linear effect of heating time. Inclusion of reducing sugars in reaction media caused ammonia release suppression greater than could be accounted for by effects of pH, moisture adjustment and heating time. However, interactions were also found among reducing sugars and the linear effect of heating time, which suggests rate of reactivity was different for various reducing sugar sources.

Ammonia release from commerical soybean meal treated with xylose was lower at all heating times than when commercial soybean meal was treated with fructose, lactose or glucose. These data are in agreement with those of example 1 where xylose was the most reactive reducing sugar. An interaction was noted when fructose was compared to glucose by the linear effect of heating time. Fructose appeared to react similarly to glucose after heating for 30 minutes, while at 60 minutes glucose produced greater ammonia release suppression than fructose.

Data from examples 1 and 2 indicated reducing sugars reacted with soybean meal when heated and caused ammonia release suppression greater than could be accounted for by the effect of heating soybean meal without sugars. These data also demonstrated xylose to be the most reactive reducing sugar.

As shown by FIG. 5, an interaction was found between soybean meal sources and the linear effect of heating. Without heat application, ammonia release from untoasted soybean meal was higher than from commercial soybean meal. The interaction between commercial soybean meal and untoasted soybean meal across heating times might be expected since heating proteins reduced susceptibility to degradation by ruminal microbes.

The different ammonia release values for commercial soybean meal and untoasted soybean meal when samples were not heated (0 minutes) may be the result of heating which occurred during commercial processing of soybean meal without sugar. However, similar ammonia release values were observed for both soybean meal sources for 60 minutes. These data indicate nonenzymatic browning produces similar ammonia release suppression from either untoasted soybean meal or commercial soybean meal, though at different rates.

No interactions were noted between pH and heating times as shown in FIG. 6. Addition of NaOH to change pH to 8.5 or 10.0 resulted in lower ammonia release than for samples heated at natural pH (6.5). Samples treated to pH 10.0 showed lower ammonia release than those of pH 8.5. The effect of heating time averaged across pH treatments reduced ammonia release in a negative quadratic manner.

Amounts of NaOH required to change pH to 8.5 and 10.0 were $2.01 \times 10^{-4}$ and $3.58 \times 10^{-4}$ moles/g soybean meal, respectively. Random testing of the supernatant from tubes containing samples treated to pH 8.5 or 10.0 following the 24-hour incubations revealed values not different from tubes where soybean meal was not treated with NaOH.

The epsilon amino group of lysine is primarily affected between pH 8 and 9 because a proton is removed, making it a stronger nucleophile than a protonated primary amine. Application of NaOH induces reactions other than nonenzymatic browning if pH is allowed to rise above 10. Under these conditions, amino acids racemize and crosslinks, primarily in the form of lysinoalanine, form.

As shown by FIG. 7, an interaction was found between percent dry matter of samples and whether or not pans were sealed during heating when tested across the complete range of dry matter levels. When evaluated between 60 and 80 percent dry matter, however, interactions were not detected. The interaction appeared to manifest itself when samples contained greater than 80 percent dry matter. Samples heated in covered pans reacted more completely at low moisture levels than those in uncovered pans. Evaporative losses from uncovered pans during heating likely caused moisture to be more limiting than in covered pans, especially at high dry matter content.

Moisture is necessary for nonenzymatic browning reactions to occur since water serves as the medium through which reactants interact. However, excessive moisture content in reaction mixtures can slow the rate of nonenzymatic browning through simple dilution of reactants and, because a molecule of water is produced for each amino sugar formed, through end product inhibition. Water activity is the preferred method of expressing availability of water to participate in reactions. Water content is less descriptive than water activity since proteins, as well as other molecules, are able to tightly bind water, thereby making it unavailable to serve other purposes.

In conclusion, nonenzymatic browning reduced in vitro ammonia release from soybean meal treated under a variety of conditions. Results suggest this chemical reaction may be useful for increasing the amount of soybean meal which escapes ruminal degradation.

5. In Vivo General Conditions

Commercial soybean meal was adjusted to pH 8.5 with sodium hydroxide, and xylose added to supply 3 mol/mol of lysine. On a dry matter basis, the mixture contained 91 percent soybean meal, 8.5 percent xylose and 0.5 percent NaOH. Water was added to this mixture to adjust the dry matter content to 83 percent. Heat application was achieved by weighing 820 g soybean meal dry matter into 28 cm by 40 cm by 6 cm aluminum pans, sealing the pans with aluminum foil and heating in a forced air oven at 150 degrees Celsius. After 30 minutes, pans were removed from the oven and the soybean meal spread in a thin layer on a plastic sheet and allowed to air dry for 24 hours. The final product was compared to commercial soybean meal and urea as a source of supplemental protein in two examples.

EXAMPLE 6

The effect of nonenzymatic browning on amount of dietary soybean meal protein escaping ruminal fermentation was determined using six growing, duodenally cannulated Angus × Hereford steers (247 kg) in a simultaneously replicated 3×3 Latin square design. Cannulae were placed approximately 10 cm from the pylorus. The three treatments investigated were urea, commercial soybean meal and the prepared feed. Diets (table 1) were formulated to contain 12.5 percent crude protein equivalence and 54 percent TDN (total digestable nutrients), with supplements providing 67 percent of the dietary N.

To ensure all diets supplied adequate ruminal ammonia, urea was included as 58 percent of supplemental N (nitrogen) to diets containing commercial soybean meal and prepared feed. Alfalfa hay (15.9 percent crude protein equivalence, dry matter basis) was included to provide ruminal degradable protein. Dextrose was added to diets containing urea or commercial soybean meal at 0.64 percent of diet dry matter to equal the level of xylose supplied by the prepared feed.

The diets are shown in table 1. In this table and in tables 2-12, S.E. is the standard error of the mean, free amino groups is alpha amino nitrogen; V-A is venus minus arterial; SBM is soybean meal; GTS is glucose-treated soybean meal; CGM/BM is corn gluten meal-blood meal; U is urea; CS is control soybean meal; XTS-30 is xylose-treated soybean meal heated 30 minutes (prepared feed); XTS-55 is xylose-treated soybean meal heated 55 minutes.

TABLE 1

COMPOSITION OF DIETS FED TO DUODENALLY CANNULATED STEERS

| Ingredient | Treatment | | |
|---|---|---|---|
| | U | CS | XTS-30 |
| | % of dry matter | | |
| Ensiled ground corncobs | 70.40 | 70.40 | 70.40 |
| Ground alfalfa hay | 17.60 | 17.60 | 17.60 |
| CS | — | 6.98 | — |
| XTS-30 | — | — | 7.52 |
| Urea | 2.47 | 1.50 | 1.50 |
| Ground corn | 7.65 | 1.83 | 1.91 |
| Dicalcium phosphate | .91 | .72 | .74 |
| Dextrose | .64 | .64 | — |
| Salt | .30 | .30 | .30 |
| Trace mineral premix | .02 | .02 | .02 |
| Vitamin premix | .01 | .01 | .01 |

The trace mineral premix contains 20 percent Mg, 12 percent Zn, 7 percent Fe, 4 percent Mn, 1 percent Cu, 0.3 percent I and 0.1 percent Co vitamin premix contains 30,000 IU vitamin A, 6000 IU vitamin D and 7.5 IU vitamin E/g.

Animals were individually penned in an environmentally controlled room supplying constant light and temperature (23 degrees Celsius). Dry matter intake was restricted to 2 percent of body weight and animals were fed every 2 hours to approximate steady-state ruminal conditions. Experimental periods were 14 days in length and consisted of 10 days prefeeding and 4 days collection. Duodenal and fecal samples were collected every 8 hours, with a 10-hour interval between days to allow a shift in sampling times. This sequence of sampling allowed a sample to be obtained at every even hour of the 24-hour day. Duodenal (130 ml) samples were obtained by removal of the cannulae plug and waiting for surges of digesta that were collected in whirl-pack bags. Fecal grab samples were obtained at the time of duodenal sampling. Ensiled corncob, alfalfa hay and supplement samples were collected once daily during collection periods. Duodenal, fecal and feed samples were stored frozen.

Duodenal samples were composited on an equal volume basis within animals and period and subsampled. Fecal samples were similarly composited on an equal as-is weight basis. Composites were lyophilized and ground to pass through a 1 mm screen. Ensiled corncob samples were prepared for grinding by air drying and all feed samples were ground to pass through a 1 mm screen before being composited by period.

Laboratory analyses included indigestible acid detergent fiber, which served as the solids flow marker, N, ash and diaminopimelic acid. Because of difficulties determining bacterial N:diaminopimelic acid ratios, bacterial protein synthesis was calculated assuming 18 g bacterial N/g diaminopimelic acid. Each animal served as its own control to estimate the fraction of commercial soybean meal or prepared feed protein escaping ruminal degradation by equation 1 where percent REP is the ruminal escape estimate of soybean meal protein, TNFS is total duodenal nonammonia N flow when consuming soybean meal or prepared feed g/d (grams per day), BNFS is duodenal bacterial flow when consuming soybean meal or prepared feed (g/d), TNFU is total NAN (nonamonia nitrogen) flow when consuming urea (g/d), BNFU is bacterial N flow when consuming urea, and SNI is soybean meal N (nitrigen) intake (g/d).

$$\text{REP} = (TNFS - BNFS) - (TNFU - BNFU) \times 100 \quad \text{Equation 1}$$

$$100 - ((ND - NDU)/(PNS/100) * (PND/100))) \quad \text{Equation 2}$$

EXAMPLE 7

Three six-month old Finnsheep × Suffolk ram lambs (24.7 kg) were employed in a ×3 Latin square design to measure net FAN absorption from the portal drained viscera when urea, commercial soybean meal or prepared feed were supplemental N sources. Diets (table 2) contained 12 percent crude protein equivalence (dry matter basis) and 57 percent TDN with 65 percent of the dietary N supplied by supplement.

For diets containing commercial soybean meal, 100 percent of the supplemental N was supplied as commercial soybean meal, while for diets containing prepared feed, 60 percent of the supplemental N was supplied by prepared feed and 40 percent by urea.

TABLE 2

COMPOSITION OF DIETS FED TO CATHETERIZED LAMBS

| Ingredient | Treatment | | |
|---|---|---|---|
| | U | CS | XTS-30 |
| | % of dry matter | | |
| Ensiled ground corncobs | 64.10 | 64.10 | 64.10 |
| Ground alfalfa hay | 12.00 | 12.00 | 12.00 |
| Cane molasses | 5.00 | 5.00 | 5.00 |
| CS | — | 16.59 | — |
| XTS-30 | — | — | 9.59 |
| Ground corn | 13.35 | .39 | 6.51 |
| Urea | 2.25 | — | 1.05 |

TABLE 2-continued

COMPOSITION OF DIETS FED TO CATHETERIZED LAMBS

| Ingredient | Treatment | | |
|---|---|---|---|
| | U | CS | XTS-30 |
| | % of dry matter | | |
| Dextrose | .81 | .81 | — |
| Dicalcium phosphate | 1.18 | .73 | .94 |
| Potassium chloride | .62 | .01 | .29 |
| Ammonium sulfate | .27 | — | .13 |
| Salt | .33 | .33 | .33 |
| Magnesium oxide | .05 | — | .02 |
| Trace mineral premix | .03 | .03 | .03 |
| Vitamin premix | .01 | .01 | .01 |

Diet dry matter was fed at 2.5 percent of body weight in equal portions at 0600, 1200, 1800 and 2400 hours. Water was available ad libitum. Prior to initiation of this trial, animals were fed pelleted alfalfa for five weeks.

Lambs were placed under general anethesia for surgical implantation of hepatic portal vein, mesenteric vein and carotid arterial catheters. Following surgery, catheters were flushed twice weekly with sterile, physiological saline containing 100 units/ml heparin, 1 percent benzyl alcohol and 0.5 percent procaine penicillin G: dihydrostreptomyocin. Experimental periods were 7 days in length during which animals were adapted to diets for 6 days. On day 7, blood samples taken before the 0600 feeding and then hourly until 1100 hours.

Blood flow rates were estimated by primed, continuous infusion of 3 percent (w/v) para-amino hippuric acid into the mesenteric vein. Samples of arterial and portal blood (20 ml) were simultaneously drawn into heparinized syringes, placed into tubes containing 30 mg NaF and mixed. Packed cell volume was determined immediately by centrifugation of capillary tubes filled with blood. A 10 ml aliquot of whole blood was deproteinized for para-amino hippuric acid analysis. Plasma was deproteinized with sulfosalicylic acid for determination of FAN.

Samples of deproteinized venous and arterial whole blood were composited and analyzed for para-amino hippuric acid. Deproteinized plasma samples were analysed for FAN. Blood flow rates were calculated by multiplying the flow of blood by (100-packed cell volume)/100 and daily net portal absorption of FAN was calculated.

Net portal FAN absorption due to consumption of commercial soybean meal or prepared feed was calculated by subtracting FAN absorption when urea was the crude protein source from net portal absorption of FAN when commercial soybean meal or prepared feed were fed. Because commercial soybean meal supplied 100 percent of the supplemental N and prepared feed supplied 60 percent of the supplemental N, estimates of net portal absorption of FAN above urea for commercial soybean meal were multiplied by 0.6 to allow comparisons between commercial soybean meal and prepared feed.

7. Results And Discussion

TABLE 3

INTAKE, FLOW RATE AND APPARENT DIGESTIBILITY OF ORGANIC MATTER FOR STEERS

| Ingredient | Treatment | | | |
|---|---|---|---|---|
| | U | CS | XTS-30 | SE |
| Intake, g/d | 4663 | 4605 | 4617 | 30.0 |
| Flow, g/d | | | | |

TABLE 3-continued

| INTAKE, FLOW RATE AND APPARENT DIGESTIBILITY OF ORGANIC MATTER FOR STEERS | | | | |
|---|---|---|---|---|
| | Treatment | | | |
| Ingredient | U | CS | XTS-30 | SE |
| To duodenum | 2328 | 2281 | 2286 | 21.9 |
| Fecal excretion | 1959 | 1937 | 1947 | 19.2 |
| Apparent digestibility, % | | | | |
| Ruminal | 50.0 | 50.5 | 50.4 | .5 |
| Total tract | 57.8 | 57.9 | 57.7 | .4 |

As shown in table 3, organic matter intake was not different among treatments, as prescribed by the experimental protocol, nor was daily duodenal organic matter flow of fecal organic matter excretion different among treatments. Therefore, apparent ruminal and total tract organic matter digestibilities were not affected by treatment and averaged 50.3 and 57.8 percent, respectively.

Though differences were small, dietary N intake and soybean meal N intake were higher for steers supplemented with prepared feed than commercial soybean meal (table 4). Duodenal NAN flows were higher for steers supplemented with soybean meal than for those supplemented with urea and were higher for steers supplemented with prepared feed than commercial soybean meal. Ruminal N digestibilities were higher in steers fed urea than those fed soybean meal and were higher when commercial soybean meal was fed than when prepared feed was fed.

Bacterial N flow to the duodenum of each animal was calculated by multiplying the quantity of diaminopimelic acid reaching the duodenum by 18 g bacterial N/g diaminopimelic acid. Daily duodenal flow of bacterial N was higher when soybean meal was fed than when urea was fed, but was not different between commercial soybean meal and prepared feed.

TABLE 4

| INTAKE, FLOW, APPARENT DIGESTIBILITY AND RUMINAL ESCAPE OF NITROGEN (N) FROM STEERS | | | | |
|---|---|---|---|---|
| | Treatment | | | |
| Ingredient | U | CS | XTS-30 | SE |
| N intake, g/d | 97.9 | 97.1 | 100.6 | .6 |
| Soybean N intake, g/d | — | 25.8 | 27.3 | .5 |
| Duodenal flow, g/d | | | | |
| Nonammonia N | 65.2 | 71.4 | 79.3 | 1.4 |
| Bacterial N | 28.1 | 31.9 | 31.4 | .8 |
| Dietary N | 37.1 | 39.5 | 47.9 | 1.4 |
| Fecal excretion, g/d | 29.3 | 30.3 | 32.9 | .8 |
| Apparent digestibility, % | | | | |
| Ruminal | 33.6 | 26.2 | 21.4 | 1.6 |
| Total tract | 69.9 | 68.6 | 67.3 | .8 |
| Ruminal escape of soybean N, % | — | 13.1 | 33.7 | 7.0 |

Dietary N flows (including protozoal and endogenous N) were higher for soybean meal fed animals than for urea fed animals and were higher for animals supplemented with prepare feed than commercial soybean meal. Estimated ruminal escape values for commercial soybean meal and prepared feed were 13.1 and 33.7 percent, respectively, and were different.

Fecal N excretion was higher when animals were fed soybean meal than when fed urea, and higher when prepared feed was fed than when commercial soybean meal was fed. These differences appear to be a function of the higher N intake for cattle supplemented with prepared feed since apparent total tract N digestibility comparisons were not different. That total tract N digestibility in steers supplemented with prepared feed was not lower than in steers supplemented with commercial soybean meal was encouraging since nonenzymatic browning reactions reduce N digestibility. Because N digestibility was not affected, the data suggests protein protection occurred as a result of reversible nonenzymatic browning.

As shown in table 5, dry matter intake and packed cell volume were not different among treatments. Portal blood flow, however, was higher in soybean meal supplemented lambs than urea supplemented lambs, and tended to be higher in lambs supplemented with prepared feed than those receiving commercial soybean meal. Portal blood flow estimates observed in this example are generally higher than values reported in the literature where primed-continuous infusion of para-amino hippuric acid has been the method of measurement. In the present studies, blood samples were obtained between the 0600 and 1200 hour feedings with the intent that portal blood flow during this interval would be representative of mean daily portal blood flow.

Differences due to supplemental N sources were not statistically significant for either venous-arterial differences in FAN concentrations nor net portal FAN absorption, though values were numerically higher for lambs supplemented with prepared feed than those supplemented with commercial soybean meal. Calculated at equal soybean meal N intake, daily absorption of FAN from prepared feed was approximately three times that of commercial soybean meal.

TABLE 5

| BODY WEIGHT, FEED INTAKE AND BLOOD MEASUREMENTS FOR LAMBS | | | | |
|---|---|---|---|---|
| | Treatment | | | |
| Ingredient | U | CS | XTS-30 | SE |
| Body weight, kg | 24.2 | 25.1 | 24.8 | .8 |
| Dry matter intake, g/d | 631 | 638 | 631 | 11.4 |
| Packed cell volume, % | 20.49 | 17.97 | 21.04 | 1.60 |
| Portal blood flow, ml/min | 1357 | 1864 | 2196 | 125 |
| Portal blood flow, liters*h$^{-1}$/kg$^{.75}$ | 7.5 | 9.9 | 11.8 | .6 |
| AAN$^e$ concentration, V-A difference, mmol/l | .180 | .195 | .233 | .045 |
| AAN absorption, mmol/d | 281 | 447 | 578 | 113 |
| AAN absorption above urea, mmol/d | | | | |
| Observed | 0 | 166 | 297 | 113 |
| At equal SBM intake | 0 | 100 | 297 | 90 |

Since uncontrolled nonenzymatic browning can produce proteins of low digestibility, testing was necessary to determine the effect of nonenzymatic browning on ruminal escape of soybean meal and whether protein digestibility was compromised. Examples 6 and 7 suggest general agreement on the effect of nonenzymatic browning on metabolism of soybean meal. Example 6 showed ruminal escape of prepared feed to be approximately 2.6 times that of commercial soybean meal and total tract N digestibilties were similar. Data from example 7 suggested, when calculated at equal soybean meal protein intake, net portal absorption of FAN from soybean meal was approximately 3 times higher for prepared feed than commercial soybean meal.

8. In Vitro Examples

EXAMPLE 8

Objectives of example 8 were: (1) to determine protein efficiency of prepared feed relative to untreated, commercial soybean meal, and (2) to determine if xylose-treated soybean meal heated longer than 30 minutes would cause improved or reduced protein efficiency relative to prepared feed. The second xylose treated soybean meal, XTS-four supplemental N sources, which included urea, commercial soybean meal, prepared feed and XTS-55, was prepared similarly to prepared feed except heating was for 55 minutes at 150 degrees Celsius.

Forty-eight 3-month old Finnsheep × Suffolk lambs (22 kg) were utilized in a randomized complete block design. Twelve animals from each of three blocks (ewes (22 kg)), light wethers (20 kg), heavy wethers (26 kg)) were randomly allotted to each of four supplemental N sources, which included urea, commercial soybean meal, prepared feed and XTS-55. Four levels of soybean protein were fed within each soybean meal source. Levels of commercial soybean meal were 100, 80, 60 and 40 percent of supplemental N as commercial soybean meal, the balance as urea. Levels of prepared feed and XTS-55 were 60, 45, 30 and 15 percent of supplemental N from the respective source, the balance as urea.

Supplements, which comprised 18.9 percent of diet dry matter, supplied 65 percent of the dietary crude protein equivalence. The diets (table 6) were balanced for 12.2 percent crude protein equivalents and 57 percent total digestible nutrients. Glucose was included in diets fed to lambs consuming urea and commercial soybean meal at 0.81 percent of diet dry matter, equalling the quantity of xylose provided by prepared feed and XTS-55.

TABLE 6
COMPOSITION OF DIETS FED TO LAMBS

| | Treatment | | |
|---|---|---|---|
| Ingredient | U | CS | XTS-30 or XTS-55 |
| | % of dry matter | | |
| Ensiled ground corncobs | 64.10 | 64.10 | 64.10 |
| Ground alfalfa hay | 12.00 | 12.00 | 12.00 |
| Cane molasses | 5.00 | 5.00 | 5.00 |
| CS | — | 16.59 | — |
| XTS-30 or XTS-55 | — | — | 9.61 |
| Ground corn | 13.35 | .39 | 6.49 |
| Urea | 2.25 | — | 1.05 |
| Glucose | .81 | .81 | — |
| Dicalcium phosphate | 1.18 | .73 | .94 |
| Potassium chloride | .62 | .01 | .29 |
| Ammonium sulfate | .27 | — | .13 |
| Salt | .33 | .33 | .33 |
| Magnesium oxide | .05 | — | .02 |
| Trace mineral premix | .03 | .03 | .03 |
| Vitamin premix | .01 | .01 | .01 |

Throughout the 80 day trial, animals were individually fed once daily. Diets were rationed as a percent of body weight determined by the quantity of feed consumed by lambs fed urea. Water was available ad libitum.

Initial and final weights of lambs were determined as means of three consecutive day weights. Animals were housed in a room supplying continuous light and constant temperature (23 degrees Celsius). Feed refusals were measured weekly and sampled for dry matter analysis. Dry matter contents of feeds and feed refusals were determined by drying samples in a forced air oven at 60 degrees Celsius for 72 hours.

Protein efficiencies of soybean meal sources were determined. Dry matter and soybean meal protein intakes, and gain and feed efficiency data were analyzed for main effects of N source.

EXAMPLE 9

Apparent digestibilities of protein supplied by urea, commercial soybean meal and prepared feed and XTS-55 were measured. Twenty-four Finnsheep × Suffolk wether lambs (27 kg) were fitted with canvas fecal collection bags and assigned to one of four dietary treatments in a completely randomized design. Diets (table 6) were individually fed once daily at 2.6 percent of body weight in a room supplying continuous light and constant temperature (23 degrees Celsius).

The experiment consisted of 10- day adaption followed by a 7-day fecal collection. During the collection period, feces were weighed daily and a 10 percent aliquot frozen. Feeds were sampled daily during collection. Composites were subsampled for dry matter determination and dried in a forced air over at 60 degrees Celsius for 72 hours. The remainder of composites were lyophilized and ground to pass through a 1 mm screen. Samples were analyzed for N by the macro-Kjeldahl producers.

Digestibility of N of soybean meal origin was estimated by equation 2 where ND is apparent N digestibility by lambs consuming commercial soybean meal or prepared feed, NDU is mean apparent N digestibility by lambs consuming urea, PNS is percent of supplemental N supplied by commercial soybean meal (100 percent), prepared feed (60 percent) or XTS-55 (60 percent), and PND is percent of dietary N supplied by supplement (65 percent). Values obtained were estimates relative to urea, which was assumed to be 100 percent digestible. Data were analyzed as a completely random design by analysis of variance.

EXAMPLE 10

Example 10 was conducted to determine if protein efficiency of soybean meal could be improved by treating with a less costly reducing sugar, glucose. Using an in vitro protease (ficin) assay, soybean meal treated with 1, 3 or 5 mol glucose/mol lysine and heated for 30, 60 or 90 minutes at 150 degrees Celsius was compared to prepared feed. Dry matter content (percent) and pH of all samples prior to heating were 80 and 8.5, respectively.

Data (table 7) showed degradability of soybean meal treated with 2 or 3 mol glucose/mol lysine and heated 60 minutes was similar to that of prepared feed. Protease degradability data were taken to suggest that glucose-treated soybean meal would have a similar nutritive value as prepared feed. Glucose-treated soybean meal was prepared by adding 3 mol glucose/mol lysine, adjusting DM content and pH to 80 percent and 8.5, respectively, and heating for 60 minutes according to procedures previously described.

TABLE 7
EFFECT OF GLUCOSE LEVELS AND HEATING TIME AT 150 C. ON FICIN DEGRADABILITY OF SOYBEAN PROTEIN

| | Control | Xylose | Glucose | | |
|---|---|---|---|---|---|
| Level (mol/mol lysine): | — | 3 | 1 | 2 | 3 |
| Min at 150 C. | | Undigested N, % of original | | | |
| 30 | 31.0 | 61.5 | 36.8 | 40.2 | 38.1 |
| 60 | 44.1 | | 55.5 | 64.2 | 66.9 |
| 90 | 53.8 | | 76.6 | 76.4 | 78.0 |

Sixty mixed breed steers (218 kg) were fed 105 days to measure protein efficiency of glucose-treated soybean meal relative to commercial soybean meal. The experimental design was a randomized complete block in which cattle were randomly assigned to one of two open front confinement barns Supplemental N sources were urea, commercial soybean meal, glucose-treated soybean meal and a 50:50 (protein basis) mixture of corn gluten meal and blood meal which served as the positive control. Twelve animals were randomly assigned to receive urea, and sixteen animals randomly assigned to receive commercial soybean meal, glucose-treated soybean meal or corn gluten meal and blood meal. Levels of commercial soybean meal were 100, 80, or 40 percent of the supplemental N, the balance as urea. Levels of glucose-treated soybean meal and corn gluten meal and blood meal were 60, 45, 3 15 percent of supplemental N, the balance as urea. Cattle were individually fed through Calan-Broadbent electronic gates.

Diets (table 8) contained 11.5 percent crude protein equivalents and 55 percent total digestible nutrients. Supplements, which comprised 15.85 percent of diet dry matter, supplied 57 percent of dietary N.

TABLE 8
COMPOSITION OF DIETS FED TO STEERS IN TRIAL 3 AND LAMBS

| | Treatment | | | |
|---|---|---|---|---|
| Ingredient | U | CS | GTS | CGM/BM |
| | % of dry matter | | | |
| Ensiled ground corncobs | 66.15 | 66.15 | 66.15 | 66.15 |
| Ground alfalfa hay | 18.00 | 18.00 | 18.00 | 18.00 |
| CS | — | 13.84 | — | — |
| GTS | — | — | 8.20 | — |
| Corn gluten meal | — | — | — | 2.46 |
| Blood meal | — | — | — | 1.81 |
| Ground corn | 10.97 | .05 | 5.15 | 7.81 |
| Urea | 1.82 | — | .84 | .81 |
| Glucose | .80 | .80 | — | .80 |
| Dicalcium phosphate | 1.10 | .72 | .90 | 1.06 |
| Potassium chloride | .49 | — | .23 | .49 |
| Salt | .31 | .31 | .31 | .31 |
| Ammonium sulfate | .29 | — | .17 | .23 |
| Magnesium oxide | .04 | — | .02 | .04 |
| Sulfur | — | .02 | — | — |
| Limestone | — | .08 | — | — |
| Trace mineral premix | .02 | .02 | .02 | .02 |
| Vitamin premix | .01 | .01 | .01 | .01 |

Glucose was included in diets containing urea, commercial soybean meal and corn gluten meal and blood meal at 0.81 percent of diet dry matter, equalling the level supplied by glucose-treated soybean meal.

Feed was rationed once daily as a percent of body weight determined by the quantity of feed consumed by steers fed urea. Water was available ad libitum. Samples of feeds were obtained weekly and dry matter was determined by drying samples at 60 degrees Celsius for 72 hours. Supplement samples were analyzed for N by the macro-Kjeldahl technique to ensure proper N content.

Initial and final weights of steers were determined as means of three consecutive day weights.

Protein efficiencies were determined as previously described. Daily dry matter and protein intakes, and gain and feed efficiency data were analyzed for main effects of protein source by analysis of variance of a randomized complete block design.

EXAMPLE 11

Apparent digestibility of protein supplied by urea, commercial soybean meal and prepared feed was determined. Eighteen Finnsheep × Suffolk wether lambs (40 kg) were fitted with canvas fecal collection bags and assigned to three dietary treatments (urea, commercial soybean meal and glucose-treated soybean meal; table 8) in a completely randomized design. Lambs were individually fed at an equal percent of body weight in metabolism crates under continuous light and constant temperature (23 degrees Celsius). Protocol and response variables for this experiment were as described in example 7.

9. Results and Discussions

Protein efficiency is defined as daily gain observed above that of animals fed urea per unit of true protein supplemented. Protein efficiencies of commercial soybean meal, prepared feed and XTS-55 fed to sheep in example 7 are presented as slopes in FIG. 8.

Figure 8:
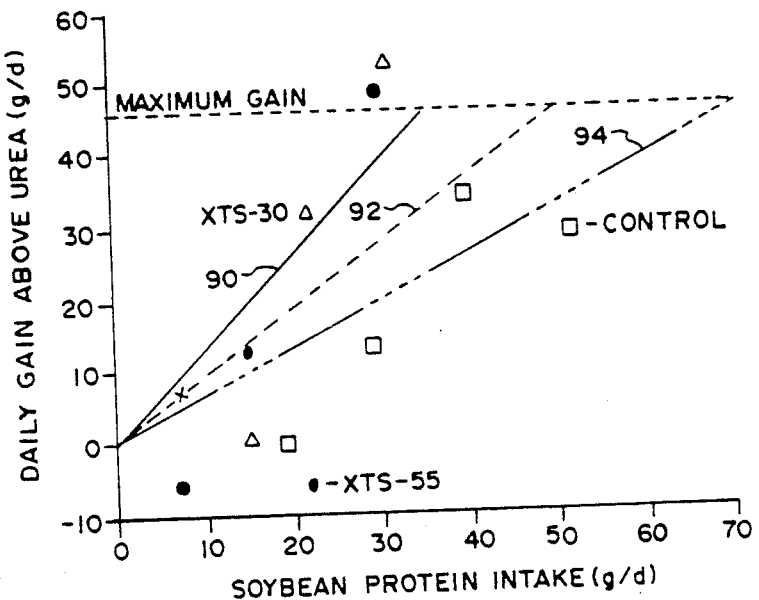
FIG. 8 is a graph illustrating the protein efficiency of feed treated in accordance with the invention.

In FIG. 8, there is shown protein efficiency by lambs consuming control soybean meal (commercial soybean meal), xylose-treated soybean meal heated 30 minutes (prepared feed) and xylose-treated soybean heated 55 minutes (XTS-55), in example 8. Slopes and standard errors for commercial soybean meal (curve 94), prepared feed and XTS-55 were, respectively 0.63, 0.16; 1.27, 0.31; 0.91, 0.28. Comparisons were commercial soybean meal vs. prepared feed (curve 90) and prepared feed vs. XTS-55 (curve 92). Protein efficiency of prepared feed was approximately two times higher than that of commercial soybean meal. Protein efficency of XTS-55 was intermediate to prepared feed and commercial soybean meal and not statistically different than prepared feed.

As intended, dry matter intakes by lambs in example 7 were not different among treatments (table 9). However, gains and feed conversions (gain/dry matter intake) were higher for lambs fed soybean meal than urea. No differences were observed among commercial soybean meal, prepared feed and XTS-55 for gain or feed conversion. However, gain and feed conversion, when measured below an animal's protein requirement, would be expected to reflect both the quantity and ruminal degradability of protein fed. Half as much protein from prepared feed was required to achieve gains and feed conversions equal to lambs fed commercial soybean meal.

TABLE 9
INTAKE AND PERFORMANCE DATA OF LAMBS IN TRIAL 1

| | Treatment | | | | |
|---|---|---|---|---|---|
| Item | U | CS | XTS-30 | XTS-55 | SE |
| Intake of: | | | | | |
| Dry matter, g/d | 610 | 610 | 635 | 631 | 17 |
| Dry matter, % of body weight | 2.58 | 2.55 | 2.55 | 2.60 | .03 |
| Protein above urea-fed | — | 35.4 | 19.4 | 18.9 | 3.0 |

TABLE 9-continued

| INTAKE AND PERFORMANCE DATA OF LAMBS IN TRIAL 1 | | | | | |
|---|---|---|---|---|---|
| | Treatment | | | | |
| Item | U | CS | XTS-30 | XTS-55 | SE |
| lambs, g/d | | | | | |
| Gain, g/d | 35.8 | 52.7 | 56.6 | 46.3 | 7.4 |
| Gain/dry matter intake[e] | .057 | .083 | .090 | .073 | .011 |

Dry matter intakes by lambs in example 8 were not different among treatments (table 5). Apparent dry matter digestibilities were lower by lambs consuming prepared feed than those fed XTS-55, but no explanation for this occurrence can be given.

Apparent digestibilities of N were lower for soybean meal-supplemented lambs than urea-supplemented lambs and were lower for lambs supplemented with prepared feed and XTS-55 than those fed commercial soybean meal. Apparent N digestibility was not different among prepared feed and XTS-55. Since protein efficiency of XTS-55 was numerically, but not statistically, lower than prepared feed in example 7 and since digestibility of N from prepared feed was not different from that of XTS-55, heating xylose-treated soybean meal longer than 30 minutes may be unnecessary to achieve treatment.

Presumably treating soybean meal by controlled nonenzymatic browning reduced ruminal proteolysis of prepared feed, thereby reducing urinary N excretion and increasing postruminal metabolizable protein flow per unit of protein consumed compared to commercial soybean meal.

Figure 9:
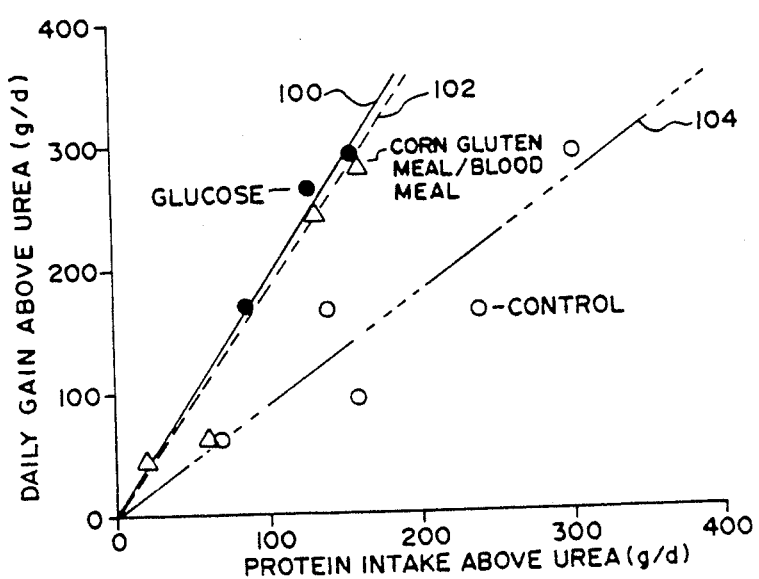
FIG. 9 is another graph illustrating protein efficiency of feed treated in accordance with the invention.

In FIG. 9, there is shown protein efficiency by steers consuming commercial soybean meal, glucose-treated soybean meal and corn gluten meal/blood meal. Slopes and standard errors for commercial soybean meal, glucose-treated soybean meal and corn gluten meal/blood meal were, respectively 0.90, 0.10; 1.91, 0.21; 1.85, 0.21. Comparisons were made between commercial soybean meal vs. glucose-treated soybean meal and glucose-treated soybean meal vs. corn gluten meal/blood meal.

Protein efficiency was more than two times higher for steers supplemented with glucose-treated soybean meal (curve 100) than for those supplemented with commercial soybean meal (curve 104), but was not different than that from steers fed corn gluten meal/blood meal (curve 102). The corn gluten meal and blood meal mixture was selected as the positive control because the individual proteins are high ruminal escape proteins. Protein efficiency of corn gluten meal/blood meal relative to commercial soybean meal in the present study was within the range of values previously reported.

Dry matter intakes by steers in example 9 were not different among treatments as shown by table 9. Averaged across all levels of supplemental N, intake of protein from commercial soybean meal was approximately two times higher than that from glucose-treated soybean meal and corn gluten meal/blood meal while animal daily gains and feed conversions (gain/dry matter intake) were similar. Metabolizable protein was first limiting in the basal diet since steers consuming urea had lower gains and feed conversions than those consuming commercial soybean meal, glucose-treated soybean meal or corn gluten meal/blood meal. The weight gain improvement using treated feed is shown in table 10.

Dry matter intakes by lambs in example 4 were not different among treatments (tables 11 and 12) since animals were limit fed. However, apparent dry matter digestibilities were higher for lambs supplemented with soybean meal than those supplemented with urea. It may be that alfalfa did not supply adequate quantities of ruminal degradable protein to support optimum microbial growth in lambs supplemented with urea.

Apparent dietary N digestibilities were not different among treatments. However, calculated digestibility of N from glucose-treated soybean meal was 6.5 percent lower than that from commercial soybean meal.

TABLE 10

| INTAKE AND PERFORMANCE DATA OF STEERS | | | | | |
|---|---|---|---|---|---|
| | Treatment | | | | |
| Item | U | CS | GTS | CGM/BM | SE |
| Intake of: | | | | | |
| Dry matter, kg/d | 4.96 | 5.06 | 5.17 | 5.02 | .10 |
| Dry matter, % of body weight | 2.10 | 2.10 | 2.10 | 2.11 | .01 |
| Protein above urea-fed steers, g/d | — | 204 | 110 | 95 | 15 |
| Gain, kg/d | .27 | .46 | .47 | .43 | .04 |
| Gain/dry matter intake | .053 | .090 | .091 | .086 | .007 |

TABLE 11

| INTAKE AND DIGESTIBILITY OF DRY MATTER AND NITROGEN (N), AND RECOVERY IN FECES OF ACID DETERGENT INSOLUBLE N AND PEPSIN INSOLUBLE N FROM LAMBS | | | | | |
|---|---|---|---|---|---|
| | Treatment | | | | |
| Item | U | CS | XTS-30 | XTS-55 | SE |
| Dry matter intake, g/d | 703 | 716 | 704 | 729 | 44 |
| Digestibility of (%): | | | | | |
| Dry matter | 59.1 | 61.0 | 58.7 | 61.3 | 1.0 |
| Nitrogen | 69.7 | 67.6 | 62.5 | 63.8 | 1.1 |
| Soybean N | — | 96.5 | 77.4 | 81.5 | 2.5 |
| Recovery of (%): | | | | | |
| Acid detergent insoluble N | 60.0 | 60.4 | 36.8 | 37.0 | 1.5 |
| Pepsin insoluble N | 151.8 | 118.4 | 126.3 | 114.0 | 3.6 |

TABLE 12

| INTAKE AND DIGESTIBILITY OF DRY MATTER AND NITROGEN (N), AND RECOVERY IN FECES OF ACID DETERGENT INSOLUBLE N AND PEPSIN INSOLUBLE N FROM LAMBS | | | | |
|---|---|---|---|---|
| | Treatment | | | |
| Item | U | CS | GTS | SE |
| Dry matter intake: | | | | |
| g/d | 986 | 1009 | 940 | 33 |
| % of body weight | 2.45 | 2.47 | 2.45 | .01 |
| Digestibility of (%): | | | | |
| Dry matter | 60.6 | 61.7 | 62.9 | .7 |
| Nitrogen | 70.0 | 69.9 | 68.0 | 1.0 |
| Soybean N | — | 99.9 | 93.4 | 2.15 |
| Recovery of (%): | | | | |
| Acid detergent insoluble N | 65.0 | 62.8 | 53.5 | 1.6 |
| Pepsin insoluble N | 114.6 | 107.7 | 112.3 | 3.4 |

Thus, a 100 percent improvement in protein efficiency was noted in example 9 as a result of treating soybean meal by nonenzymatic browning even though treatment depressed N digestibility of glucose-treated soybean meal in example 10. These results are in general agreement with results of examples 7 and 8, although digestibility of protein from prepared feed was estimated as somewhat lower than glucose-treated soybean meal.

10. In Vitro Examples

EXAMPLE 12

Commercial solvent extract, dehulled soybean meal (47.5 percent protein) is dry blended with spray dried spent sulfite liquor containing 19.5 percent reducing sugars. The spent sulfite liquor is added at a rate of 5 or 10 percent on soybean meal (as is basis), depending on the specified treatment level. In some treatments, hydrated lime was added at a rate of 6 percent by weight on spent sulfite liquor.

The mixture is metered, at a rate of 1 kg/minute, into a cylindrical mixing chamber 18 inches in length and 8 inches in diameter where it is heated by direct application of low pressure steam (24 psi). Water is pumped into the chamber at a rate of 4 percent on the mix. Starting temperature of the mixture is 20 to 21 degrees Celsius. In less than 15 seconds, the temperature is increased to 90 to 95 degrees Celsius.

The hot feed exits the conditioning chamber into the top of a vertical holding bin where it slowly descends to the outlet emerging 90 or 120 minutes later. The reaction is exothermic and will increase in temperature from 5 to 10 degrees Fahrenheit, depending on the formulation, while in the bin.

Feed is removed from the bottom of the bin by a metering screw. The hot feed is held on wire screen as ambient air is forced upward through it. This cools and drys the feed.

11. Results and Discussion

The results (table 13) showed only minor changes with changes in pH and temperature and a greater effect of the level of sulfite liquor used. This example indicates that much less reducing sugar may be usable under controlled conditions.

TABLE 13

| % CLS ON SBM | LIME % ON CLS | HOLD TIME MIN | ORIG PROCESS 160-170 | FINAL PROCESS 195-205 | Temp. Range 70° C.-75° C. AMMONIA MG/100 ML | Temp. Range 90° C.-95° C. AMMONIA MG/100 ML |
|---|---|---|---|---|---|---|
| 0 | 0 | 0 | 39 |  | 40.8 | 39.9 |
| 10 | 6 | 120 | 25 | 11 | 17.9 | 12.8 |
| 10 | 6 | 90 |  |  | 21.8 | 14.7 |
| 10 | 0 | 120 |  |  | 18.9 | 11.1 |
| 5 | 6 | 120 | 35 | 19 | 29.8 | 19.9 |

It is possible that the amount of reducing sugar may be as low as ⅓ mole of reducing sugar to one mole of epsilon amino groups or lower and as little as 0.5 percent xylose to the protein by weight. Presumably, since this is below the theoretical amount, there is an inhibiting effect that reduces the epsilon amino groups subject to microbial action without reaction of all of them with carbonyl groups of reducing sugars.

EXAMPLE 13

Four commercial lignosulfonates were added to solvent extract soybean meal at a rate of 5 percent by weight on the soybean meal, the mixtures were pelleted under identical conditions, and the resultant pellets tested for degradability of soybean protein by rumen microorganisms maintained in batch culture.

The four commercial lignosufonates were sold under the brand names Toranil (a trademark of Rhinelander Paper Company), AmeriBond, Maratan SAI and, Maratan SNV, all three of the latter being trademarks of Reed Lignin Corporation. The first two of the lignosulfonates contained less than 2 percent and 1 percent by weight, respectively, of reducing sugars and the last two contained 16 percent and 13 percent by weight, respectively, of reducing sugars.

Figure 10:
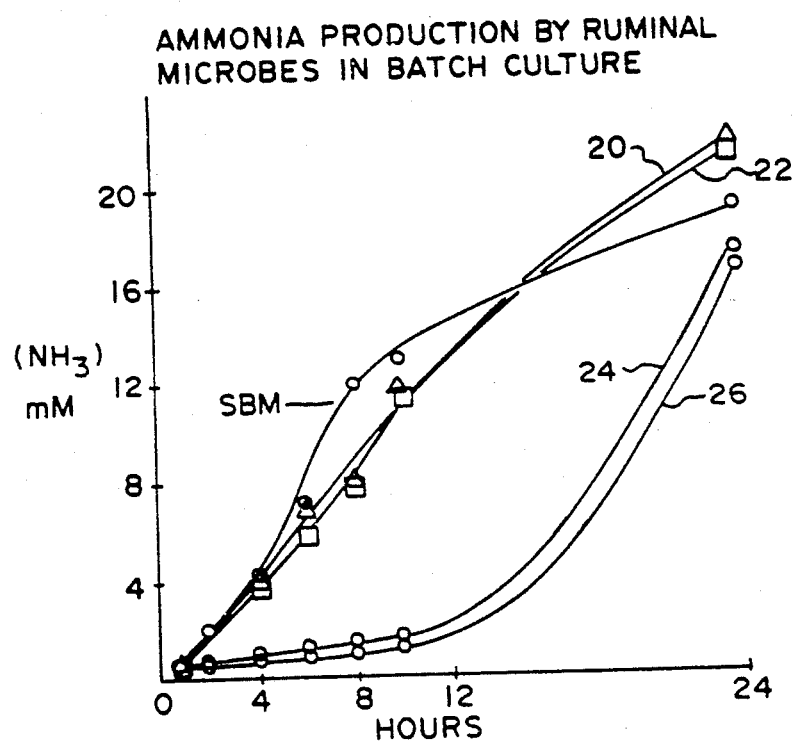
FIG. 10 is a graph illustrating the dependency of carbohydrate content on the effectiveness of sulfite liquor as an additive to feeds.

The two samples with less than 5 percent reducing sugars showed no reduction in protein degradability indicated by curves 20 and 22 in FIG. 10 and the third and fourth columns of table 14.

The two samples with more than 15 percent reducing sugars showed significantly depressed protein degradability, as indicated by curves 24 and 26 in FIG. 10 and the last two columns of table 14. This comparison indicates that simple pelleting of a soybean meal-lignosulfonate mixture does not guarantee reduced protein degradability; additional factors are involved and must be controlled.

EXAMPLE 14

Ultrafiltration was used to concentrate calcium lignosulfonate molecules (CaLS03) occuring in spent sulfite liquor. The permeate fraction retained low molecular weight calcium lignosulfonates, oligosacchrides and wood sugars (primarily xylose).

TABLE 14

| | Net in vitro ammonia production by rumen bacteria, mg/100 ml | | | | |
|---|---|---|---|---|---|
| Hours | SBM | Toranil | AmeriBond | Maratan | Maratan SNV |
| 1 | 0.9 | 0.8 | 0.7 | 0.4 | 0.4 |
| 2 | 2.2 | 2.2 | 1.9 | 0.9 | 0.6 |
| 4 | 4.7 | 4.2 | 3.8 | 1.1 | 0.9 |
| 6 | 7.4 | 6.8 | 5.9 | 1.3 | 0.9 |
| 8 | 12.0 | 8.2 | 7.8 | 1.8 | 1.1 |
| 10 | 13.5 | 11.8 | 11.4 | 2.4 | 1.8 |
| 24 | 19.0 | 22.0 | 21.5 | 17.7 | 17.3 |

The original spent sulfite liquor and its concentrate and permeate fractions were spray dried to approximately 95 percent solids. Analyses for the resulting powders are listed in table 15.

Solvent extract soybean meal was combined with 1, 2, 4 and 8 percent sulfite liquor, 4 percent concentrate, or 4 percent permeate. Addition rates are expressed as percent by weight of additive on soybean meal, as is basis (about 10 percent moisture). The various mixtures were conditioned to 85 degrees Celsius with direct application of steam, pelleted, and returned to room temperature by evaporative cooling under a forced air stream. Total process time above room temperature was less than five minutes.

Degradability of protein by ruminal microbes was determined in batch culture for each sample. Results are plotted in FIG. 11. Protection increased directly with addition of spent sulfite liquor. Permeate was approximately 30 percent more effective than sulfite liquor, corresponding closely to the 33 percent increase in reducing sugars in the permeate fraction. The concentrated CaLSO3 fraction (CONC) did not provide protection against degradability, indicating that calcium lignosulfonate per se is not an effective agent for treatment of soybean meal.

TABLE 15

|  | SSL | CONC. | PERM |
| --- | --- | --- | --- |
| Ca, % | 3.94 | 3.43 | 4.18 |
| Na, % | 0.03 | 0.02 | 0.04 |
| Total S, % | 5.79 | 5.63 | 5.93 |
| CaLSO3, % | 56.37 | 80.42 | 46.35 |
| Reducing Sugars, % | 17.13 | 5.32 | 22.80 |

Figure 11:
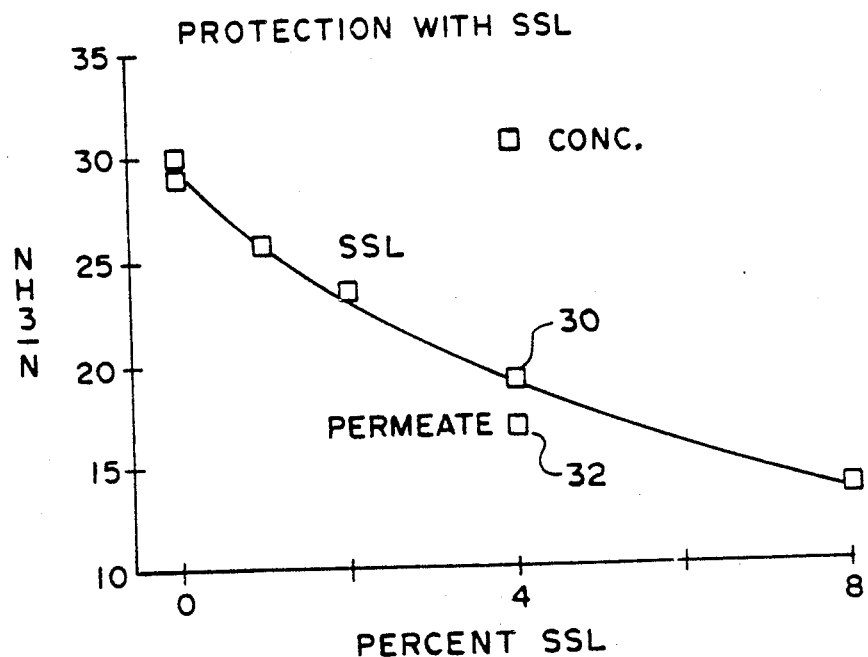
FIG. 11 is a graph illustrating the use of sulfite liquor as an additive to feed in accordance with the invention.

As shown in FIG. 11, data point 30 represents 17 percent reducing sugar and data point 32 represents 22 percent reducing sugar is permeate.

EXAMPLE 15

Permeate proceduced by ultrafiltration of spend sulfite liquor was washed with an alcohol-amine mixture to extract any remaining calcium lignosulfonate molecules. The aqueous phase contianing sulfite liquor reducing sugars was concentrated and applied to solvent extract soybean meal as a protein protection agent, as were the original sulfite liquor, its permeate and technical grade xylose. Each was dissolved in water and applied such that the solution provided 5 percent added moisture on soybean meal. Samples were mixed in a V-blender equipped with a high speed agitator and stored in plastic bags.

Blended samples were conditioned to 90 degrees Celsius by direct application of steam, pelleted, and returned to room temperature by evaporative cooling under a stream of forced air. Prior to pelleting, one sample was observed to have caked and darkened slightly during storage. A portion of this unpelleted meal was retained for testing. Protein degradation by ruminal microbes was determined by 6-hour batch culture fermentation.

Concentration of the soybean meal sugars, the major portion of which is known to be xylose, through ultrafiltration and extraction increased the effectiveness of the protein protection agents. Xylose alone was effective, indicating that soybean meal reducing sugars alone are effective and reducing sugars alone are effective treatment agents.

It was also learned that, under some conditions, reaction can occur at room temperature. In this example, a sulfite-liquor xylose soybean-meal blend reacted after storage at room temperature for 2 hours, reducing degradability to 82 percent versus untreated soybean meal pelleting this same mixture at 90 degree Celsius further reduced degradability to 42 percent of untreated soybean meal. While it is recognized that some reaction can occur at room temperature, the preferred method includes application of heat to the soybean meal-sugar mixture. These results are shown in table 16.

TABLE 16
Effect of Pelleting Soybean Meal Containing Protein Protection Agents on Release of Ammonia by Ruminal Microbes

|  | Added Reducing Sugars, % | NH3-N g/100 ml | % as SBM |
| --- | --- | --- | --- |
| Control, SBM | 0.0 | 23.5 | 100.0 |
| SSL, 3% | 0.6 | 20.4 | 86.6 |
| Permeate, 3% | 0.7 | 18.6 | 78.9 |
| Permeate Sugars, 3% | 2.7 | 9.3 | 39.7 |
| Xylose, 1% | 1.0 | 15.7 | 66.8 |
| SSL, 3% and xylose, 1% | 1.6 | 9.9 | 42.0 |
| (6) Unpelleted | 1.6 | 19.3 | 82.0 |

EXAMPLE 16

Solvent extract soybean meal obtained from four commercial sources was mixed with a permeate (4 percent solids on soybean meal) resulting from ultrafiltration of spent sulfite liquor. Permeate supplied about 0.9 percent reducing sugars on the soybean meal. Mixtures were conditioned to 85 degrees Celsius by direct application of steam, pelleted, and the hot pellets returned to room temperature by evaporative cooling under a forced air stream.

Resultant pellets were tested in 6-hour batch culture for degradability of protein by ruminal microbes. Results, listed in table 17, indicate that the process for protecting soybean meal protein is of general application, not specific to a single source of meal.

EXAMPLE 17

This example illustrates that it is possible to treat soy protein with sulfite liquor in such a manner that it will be protected from degradation by ruminal microbes, that the protection is not lost over long periods of storage time, nor is the protein's digestability by lower tract enzymes significantly reduced.

TABLE 17
Release of NH3-N (mg/100 ml) from Soy Protein by Ruminal Microbes in 6-hour Batch Culture

|  | Permeate, % | | Degradability |
| --- | --- | --- | --- |
| Source | 0.0 | 4.0 | versus SBM, % |
| Honeymead, Mankato, MN | 36.6 | 27.0 | 73.6 |
| Cargill, Savage, MN | 36.4 | 29.1 | 80.0 |
| Cargill, Chicago, Il | 40.0 | 33.1 | 82.3 |
| Boone Valley Coop, Eagle Grove, IA | 39.3 | 29.7 | 75.6 |

Solvent extract soybean meal was split and half was mixed to include 3 percent spent sulfite liquor solids, providing about 0.6 percent reducing sugars on soybean meal. The mixture was heated to 82 degrees Celsius by direct application of steam, pelleted, and returned to room temperature by evaporative cooling under a stream of forced air. The entire heating and cooling cycle took less than 5 minutes.

Pellets were ground and protein degradability by ruminal microbes determined in 6-hour batch culture. Ammonia nitrogen concentration in the treated pellets was only 47 percent of that generated with the pelleted soybean meal control. Because of this good response, this pair of samples was included in subsequent in vitro analysis over a 3-year period to provide a positive control. Results, expressed as percent degradability versus untreated soybean meal, are listed in table 18 and displayed in FIG. 12. Protection against degradability is maintained through 40 months.

TABLE 18

| Months Stored | NH3-N, mg/100 ml | | | Difference % |
|---|---|---|---|---|
| | Blank | SBM | SSL | |
| 0 | 14.7 | 35.1 | 16.5 | 47.0 |
| 3 | 17.6 | 29.5 | 13.3 | 45.0 |
| 5 | 27.7 | 37.9 | 28.7 | 75.7 |
| 6 | 21.0 | 33.3 | 20.4 | 61.3 |
| 14 | 12.3 | 17.5 | 5.5 | 31.1 |
| 20 | 16.4 | 28.6 | 16.2 | 56.5 |
| 20 | 24.5 | 37.2 | 22.6 | 60.7 |
| 25 | 17.6 | 28.2 | 14.2 | 50.3 |
| 27 | 16.2 | 27.4 | 12.1 | 44.3 |
| 28 | 11.9 | 24.8 | 9.2 | 37.2 |
| 28 | 16.9 | 32.8 | 12.9 | 39.5 |
| 29 | 16.8 | 32.3 | 13.3 | 41.3 |
| 29 | 16.3 | 27.9 | 14.4 | 51.6 |
| 39 | 22.6 | 32.9 | 18.7 | 56.8 |

Variation is not due to the sample variability rather to the microbial populations used at different periods.

Samples were analysed for pepsin digestible protein after storage for 37 months. The control soybean meal contained 43.1 percent digestible protein. Soy protein in the treated sample was 41.1 percent digestible, indicating that no significant loss of protein had occurred during long term storage.

EXAMPLE 18

Commercial solvent extract soybean meal was split into four identical batches and mixed with reducing sugars as follows:
a. Control, no additive
b. 1 percent xylose
c. 4 percent permeate from sulfite liquor
d. 1 percent xylose and 4 percent permeate
Concentration is expressed as weight percent on soybean meal, as is basis.

Mixtures were conditioned to 85 degrees Celsius by direct steam addition, pelleted, and returned to room temperature by evaporative cooling under a forced air stream. Total heating period was less than 5 minutes. This portion of the process is described as treatment.

Hot pellets, approximately 100 grams, were collected in jars from each of the four batches (a-d) and placed in a 105 degree Celsius oven for 90 minutes, after which they were rapidly returned to room temperature through evaporative cooling under a steam of forced air. This portion of the process is described as treatment 2.

Treatment 3 was included as a positive control of known bypass value. This treatment consisted of soybean meal pelleted at 82 degrees Celsius, cooled, and stored for approximately 30 months. The pellets were comprised of soybean meal alone (treatment 3a) or soybean meal mixed with 3 percent spent sulfite liquor prior to pelleting (treatment 3b).

Samples were tested for dye binding capacity and ammonia release by ruminal microbes in batch culture fermentation. Results are listed in table 19.

Treatments 1 and 2 are arranged in a 2 by 3 factorial design. Analyses of the fermentation data shows additional heat, xylose, and permeate each acted separately to reduce in vitro NH3-N concentration.

TABLE 19

| Treatment | DBC mg/gm | NH3-N mg/100 ml |
|---|---|---|
| 1a | 100.2 | 29.6 |
| 1b | 110.7 | 29.6 |
| 1c | 110.2 | 27.5 |
| 1d | 110.4 | 25.7 |
| 2a | 118.4 | 29.7 |
| 2b | 102.5 | 24.4 |
| 2c | 96.2 | 23.1 |
| 2d | 85.9 | 20.9 |
| 3a | 101.2 | 273.9 |
| 3b | 52.1 | 14.4 |

Two factor interaction occurred between both heat and xylose and heat and permeate; application of additional heat in the presence of either reducing sugar enhanced the degree of protection.

Method G: Naphthol Blue Black

The second goal of this experiment was to evaluate a new method of testing the degree of protein protection. Napthol blue black is known to bind to protein amino groups and to compete for these sites with other known protein protection agents, e.g., formaldehyde. When soybean meal is added to a solution of dye, disappearance of the dye is an indictor of the protein content. Lysine which has reacted with another reagent will not absorb dye from solution. Since the mechanism of protein protectin reaction is believed to be binding of a reducing sugar to lysine in the protein molecule, adsorption of napthol blue black by treated soybean can indicated the degree to which the protein has been successfully protected when compared to absorption by untreated meal.

Dye solution was prepared according to USDA Technical Bulletin No. 1369, The Dye Binding of Milk Protein. Samples were ground to pass a US No. 20 seive and 0.100 gms of each placed in 50 ml centrifuge tubes. Thirty milliliters of dye solution was added to each tube. The tubes were shaken at room temperature for one hour, followed immediately by 15 minutes centrifuging at 2500 rpm. Exactly one milliliter of supernatant was withdrawn from each tube and diluted to 25 milliliters. Absorbance of this solution at 615 nanometers was determined using a spectrophotometer. Results were compared to the absorbance of a 1:25 dilution of stock dye of known concentration. Beer's Law allows calculation of the concentration of dye in the test solution.

Dye binding capacity is determined by dividing the mass of dye the sample has absorbed by the mass of the sample. Typically, untreated soybean meal will have a dye binding capacity near 100 mg of dye per gram of sample. Dye binding capacity is compared to in vitro NH3-N in curve 110 in FIG. 13. Correlation is good between the two tests.

EXAMPLE 19

The purpose of this experiment was to examine the useful range of xylose in treating solvent extract soybean meal. Soybean meal contains about 3.2 percent lysine. To react with all this lysine on an equimolar basis would require 3.5 xylose. This could be considered the theoretical maximum. Deviation from this maximum occurs if xylose reacts at other sites, i.e., the terminal amine, or, if xylose binding sites are not exposed due to the tertiary structure of the protein.

Several levels of xylose, listed in table 20, were dissolved in distilled water and mixed into soybean meal to provide 20 percent added moisture. From these mixtures, 0.100 gm samples were removed, placed in prewarmed centrifuge tubes, covered, and heated for 1 and 2 hours at 80 degrees Celsius. Samples were removed from the oven, cooled, and tested for dye binding capacity.

Results (curve 120, FIG. 14) show dye binding capacity to decrease through 20 percent addition, indicating the binding sites were not yet saturated. Additional heating reduced dye binding capacity at all levels of xylose, showing that the reaction had in no case gone to completion. It should be noted from an economical viewpoint that effectiveness per dose decreases rapidly; heated for 2 hours 20 percent xylose reduce dye binding capacity by 59.5 percent but more than half of this reduction was provided by the first 1 percent xylose added.

TABLE 20

DBC vs. Heating

|  | Xylose % | 1 hr. | 2 hr. | 2 hr. % Change One % Control |
|---|---|---|---|---|
| Control | 0.0 | 77.2 | 72.1 | 0.0 |
|  | 0.5 | 68.1 | 57.4 | 20.3 |
|  | 1.0 | 60.2 | 47.4 | 34.3 |
|  | 2.0 | 48.0 | 39.7 | 44.9 |
|  | 4.0 | 42.5 | NA | NA |
|  | 10.0 | 36.3 | 33.5 | 53.5 |
|  | 20.0 | 33.8 | 29.2 | 59.5 |

12. In Vivo Examples

EXAMPLE 20

Soybean meal was metered into a Solidaire dryer at a rate of 4 kg/minute. The dryer was steam jacketed to allow application of indirect heat. A spray of water, 8 percent xylose solution, or 30 percent spent sulfite liquor solution was applied to the meal as it fell into the dryer. This spray supplied 11 to 12 percent moisture to the soybean meal and acted as the carrier for the xylose, insuring it was dissolved and able to penetrate the flakes. Moistened soybean meal entered the dryer at ambient temperature (21 degrees Celsius) and was retained for approximately three minutes, during which time it was heated to approximately 100 degrees Celsius. Hot feed exited the dryer and was transferred to an insulated container where it was held for 45 minutes, following which the feed was cooled and dried with ambient air.

Four lactating Holstein cows fitted with ruminal, duodenal and ileal cannulae were used in a 4×4 Latin square design to evaluate treated soybean meal as a source of rumen protected protein. Treatments included untreated soybean meal, heated H2O-soybean meal, heated xylose-soybean meal and heated spent sulfite liquor soybean meal. A diet consisting of 40 percent corn silage, 10 percent alfalfa cubes and 50 percent concentrate mix (dry matter basis) was fed four times daily. Diets averaged 16.8 percent crude protein with 50 percent of the total ration protein being derived from the respective soybean meal sources. Acid detergent lignin and diaminopimelic acid were used as digestibility and microbial markers, respectively.

13. Results

The results are shown in table 21. They show treatment of soybean meal with spent sulfite liquor or xylose decreased ruminal $NH_{3-N}$ concentration, ruminal protein degradation, bacterial protein synthesis and total tract protein digestion compared to untreated soybean meal. Ruminal fiber digestion was not affected by treatment.

TABLE 21

| Item | SBM | H2O-SMB | 1% Xylose-SBM | 4% $LSO_3^{-SBM}$ |
|---|---|---|---|---|
| Rumen NH3-N, mg/100 ml | 22.0 | 19.1 | 15.2 | 14.8 |
| Ruminal protein degradation, % | 70.6 | 69.6 | 55.8 | 53.7 |
| Total tract protein digestion, % | 77.4 | 75.4 | 73.6 | 71.4 |
| Bacterial protein synthesis, g N/kg CMTD | 41.5 | 34.9 | 31.4 | 33.4 |

The data demonstrate controlled nonenzymatic browning is an effective method of protecting a highly degradable protein source like soybean meal from ruminal degradation and thereby increase efficiency of protein utilization for growth. These data further demonstrate similar responses in protein efficiency relative to commercial soybean meal when either xylose or glucose were used as reducing sugars, though less heating was required when xylose was used due to its high rate of reactivity.

As can be understood from the above description, the novel feed, method of making the feed and method of feeding animals has the advantage of providing a superior economical feed and method of feeding animals.

Although a preferred embodiment has been described with some particularity, many modifications and variations may be made in the preferred embodiment without deviating from the invention. Accordingly, it is to be understood that, within the scope of the appended claims, the invention may be practiced other than as specifically described.

What is claimed is:

1. A method of making a ruminant feed comprising the steps of:
   mixing together a reducing carbohydrate and a product containing protein in quantities sufficient to cause a substantial proportion of free amine groups in the protein to react with carbonyl groups in the reducing carbohydrate to form a condensation product which is reversible to protect the protein against microbial degradation in the rumen but permit it to be digested in the post rumen tract of ruminants, wherein at least some of the reducing carbohydrate mixed with the product containing protein is glucose; and
   heating the mixture at a temperature, time and pH sufficient to cause a reversible reaction between the reducing carbohydrate and the protein wherein an early reaction product of the Maillard reaction is formed, and wherein the temperature and time are controlled to prevent the conversion of glycosylamine to a 1-amino-1-deoxy-2-ketose so as to avoid conversion of substantial portions of the early reaction product of the Maillard reaction from being converted to intermediate and final products of the Maillard reaction.

2. A method of making a ruminant feed comprising the steps of:

mixing together a reducing carbohydrate and a product containing protein in quantities sufficient to cause a substantial proportion of free amine groups in the protein to react with carbonyl groups in the reducing carbohydrate to form a condensation product which is reversible to protect the protein against microbial degradation in the rumen but permit it to be digested in the post rument tract of ruminants, wherein the reducing the carbohydrate that is mixed with the product includes ketose; and heating the mixture at a temperature, time and pH sufficient to cause a reversible reaction between the reducing carbohydrate and the protein, wherein the temperature is lower and the time is shorter than required for formation of 2-amino-2-deoxyaldose from a ketosylamine and wherein an early reaction product of the Maillard reaction is formed without conversion of substantial proportions of the early reaction product to intermediate and final reaction products of the Maillard reaction.

3. A method of making a ruminant feed comprising the steps of:

mixing a material containing protein with a reducing carbohydrate in quantities such as are suitable for the Maillard reaction and to form a condensation product which is reversible to protect the protein against microbial degradation in the rumen but permit it to be digested in the post rumen tract of ruminants, wherein said reducing carbohydrate is a reducing sugar selected from the group consisting of glucose, fructose, mannose, ribose, and mixtures thereof; and heating said mixture at a temperature, pH and time sufficient to cause early Maillard reactions but not final Maillard reactions.

4. A method according to claim 3 in which the pH is maintained above a pH of 4 during the early Maillard reactions.

5. A method according to claim 3 in which the step of mixing comprises mixing a protein supplement with a reducing carbohydrate.

6. A method of making a ruminant feed comprising the steps of:

mixing a material containing protein with a reducing carbohydrate free of xylose in quantities such as are suitable for the Maillard reaction and to form a condensation product which is reversible to protect the protein against microbial degradation in the rumen but permit it to be digested in the post rumen tract of ruminants, wherein the percentage of reducing carbohydrate on protein is about 0.5 percent to about 40 percent by weight; and heating said mixture at a temperature, pH and time sufficient to cause early Maillard reactions but not final Maillard reactions; wherein said pH is maintained above a pH of 4 during the early Maillard reactions.

7. A method of feeding ruminants comprising the steps of:

mixing together a reducing carbohydrate and a livestock feed containing protein in quantities sufficient to cause a substantial proportion of free amine groups in the protein to react with carbonyl groups in the reducing carbohydrate to form a condensation product which is reversible to protect the protein against microbial degradation in the rumen but permit it to be digested in the post rumen tract of ruminants, wherein the reducing carbohydrate is selected from the group consisting of glucose, fructose, mannose and ribose;

heating the mixture at a temperature, time and pH to cause reactions with chemical groups subject to cleavage by microbial protease to protect the groups by reversible rearrangement of atoms but not so far as to cause advanced Maillard reactions; and feeding the mixture to ruminants before substantial intermediate Maillard reaction occurs.

8. A feed according to claim 7 wherein the protein is obtained from distillers grain.

9. A feed according to claim 7 wherein the protein is obtained from brewers grain.

10. A method of feeding ruminants comprising the steps of:

mixing a feed containing a protein with a reducing sugar in quantities such as are suitable for the Maillard reaction and to form a condensation product which is reversible to protect the protein against microbial degradation in the rumen but permit it to be digested in the post rumen tract of ruminants, wherein the reducing carbohydrate is selected from the group consisting of glucose, fructose, mannose and ribose;

heating said mixture at a temperature, pH and time sufficient to cause early Maillard reactions but not advanced Maillard reactions, wherein an improved feed is obtained; and feeding the improved feed to the ruminants before substantial intermediate Maillard reactions occur.

11. A method of making a ruminant feed comprising the steps of:

mixing together a material containing protein and a reducing carbohydrate in quantities such as are suitable for the Maillard reaction and to form a condensation product which is reversible to protect the protein against microbial degradation in the rumen but permit it to be digested in the post rumen tract of ruminants, wherein at least some of said reducing carbohydrate mixed with the material containing protein is a reducing sugar selected from the group consisting of glucose, fructose, mannose and ribose; and heating said mixture a temperature, pH and time sufficient to cause early Maillard reactions but not final Maillard reactions.

12. A method of making a ruminant feed comprising the steps of:

selecting and mixing a material containing protein with a reducing carbohydrate in quantities such as are suitable for the Maillard reaction and to form a condensation product which is reversible to protect the protein against microbial degradation in the rumen but permit it to be digested in the post rumen tract of ruminants, wherein the percentage of reducing carbohydrate on protein is about 0.5 percent to about 40 percent by weight; and heating said mixture at a temperature, pH and time sufficient to cause early Maillard reactions but not final Maillard reactions; wherein said pH is maintained above a pH of 4 during the early Maillard reactions.

13. A method of feeding ruminants comprising the steps of:

mixing together a feed containing a protein and a reducing carbohydrate in quantities such as are suitable for the Maillard reaction and to form a condensation product which is reversible to protect the protein against microbial degradation in the rumen but permit it to be digested in the post rumen tract of ruminants, wherein at least some of said reducing carbohydrate mixed with the material containing protein is selected from the group consisting of glucose, fructose, mannose and ribose;

heating said mixture at a temperature, pH and time sufficient to cause early Maillard reactions but not final Maillard reactions, wherein an improved feed is obtained; and feeding the improved feed to the ruminants before substantial intermediate Maillard reactions occur.

14. A method of feeding ruminants comprising the steps of:

selecting and mixing together a feed containing a protein and a reducing carbohydrate in quantities such as are suitable for the Maillard reaction and to form a condensation product which is reversible to protect the protein against microbial degradation in the rumen but permit it to be digested in the post rumen tract of ruminants, wherein the percentage of reducing carbohydrate on protein is about 0.5 percent to about 40 percent by weight;

heating said mixture at a temperature, pH and time sufficient to cause early Maillard reactions but not intermediate Maillard reactions wherein an improved feed is obtained; and feeding the improved feed to the ruminants before substantial intermediate Maillard reactions occur.

* * * * *